United States Patent
Rad et al.

(10) Patent No.: US 10,373,369 B2
(45) Date of Patent: Aug. 6, 2019

(54) THREE-DIMENSIONAL POSE ESTIMATION OF SYMMETRICAL OBJECTS

(71) Applicant: QUALCOMM Incorporated, San Diego, CA (US)

(72) Inventors: Mahdi Rad, Graz (AT); Markus Oberweger, Graz (AT); Vincent Lepetit, Talence (FR)

(73) Assignee: QUALCOMM Technologies, Inc., San Diego, CA (US)

( * ) Notice: Subject to any disclaimer, the term of this patent is extended or adjusted under 35 U.S.C. 154(b) by 0 days.

(21) Appl. No.: 15/692,401

(22) Filed: Aug. 31, 2017

(65) Prior Publication Data

US 2018/0268601 A1   Sep. 20, 2018

Related U.S. Application Data

(60) Provisional application No. 62/472,427, filed on Mar. 16, 2017.

(51) Int. Cl.
*G06K 9/00*    (2006.01)
*G06T 15/20*   (2011.01)
(Continued)

(52) U.S. Cl.
CPC ........ *G06T 15/205* (2013.01); *G06K 9/00208* (2013.01); *G06K 9/627* (2013.01);
(Continued)

(58) Field of Classification Search
CPC . G06T 2207/10028; G06T 2207/20084; G06T 2207/20081; G06T 15/205; G06T 7/75; G06K 9/627; G06K 9/6256
See application file for complete search history.

(56) References Cited

U.S. PATENT DOCUMENTS 4,701,752 A * 10/1987 Wang ........................ G06T 3/60
                                                    345/619
2007/0019865 A1* 1/2007 Owechko ........... G06K 9/00369
                                                    382/224
(Continued)

FOREIGN PATENT DOCUMENTS

CN           102737235 A      10/2012

OTHER PUBLICATIONS

Crivellaro et al ("Novel Representation of Parts for Accurate 3D Object Detection and Tracking in Monocular Images", pp. 4391-4399, IEEE 2015) (Year: 2015).*

(Continued)

*Primary Examiner* — Amara Abdi
(74) *Attorney, Agent, or Firm* — Duane Morris LLP

(57) ABSTRACT

The present disclosure describes methods, apparatuses, and non-transitory computer-readable mediums for estimating a three-dimensional ("3D") pose of an object from a two-dimensional ("2D") input image which contains the object. Particularly, certain aspects of the disclosure are concerned with 3D pose estimation of a symmetric or nearly-symmetric object. An image or a patch of an image includes the object. A classifier is used to determine whether a rotation angle of the object in the image or the patch of the image is within a first predetermined range. In response to a determination that the rotation angle is within the first predetermined range, a mirror image of the object is determined. Two-dimensional (2D) projections of a three-dimensional (3D) bounding box of the object are determined by applying a trained regressor to the mirror image of the object in the image or the patch of the image. The 3D pose of the object is estimated based on the 2D projections.

27 Claims, 14 Drawing Sheets

(51) Int. Cl.
G06T 7/73 (2017.01)
G06K 9/62 (2006.01)

(52) U.S. Cl.
CPC ............. *G06K 9/6256* (2013.01); *G06T 7/75* (2017.01); *G06T 2207/10028* (2013.01); *G06T 2207/20081* (2013.01); *G06T 2207/20084* (2013.01)

(56) References Cited

U.S. PATENT DOCUMENTS

| | | | |
|---|---|---|---|
| 2013/0051626 A1* | 2/2013 | Abadpour | G06T 7/73 382/106 |
| 2015/0116198 A1* | 4/2015 | McCoy | G06F 3/14 345/156 |
| 2016/0174902 A1* | 6/2016 | Georgescu | G06T 7/73 600/408 |
| 2016/0300127 A1 | 10/2016 | Heifets et al. | |

OTHER PUBLICATIONS

Pavlakos G., et al., "6-DoF Object Pose from Semantic Keypoints," arXiv:1703.04670v1, Computer Vision and Pattern Recognition (cs.CV); Robotics (cs.RO), Mar. 14, 2017, pp. 1-8.

Tome D., et al., "Lifting from the Deep: Convolutional 3D Pose Estimation from a Single Image," arXiv:1701.00295v3, Computer Vision and Pattern Recognition (cs.CV), Feb. 25, 2017, pp. 1-12.

Hong J.M., et al., "SegICP: Integrated Deep Semantic Segmentation and Pose Estimation," arXiv:1703.01661V1, Robotics (cs.RO); Computer Vision and Pattern Recognition (cs.CV), Mar. 5, 2017, pp. 1-7.

* cited by examiner

THREE-DIMENSIONAL POSE ESTIMATION OF SYMMETRICAL OBJECTS

CROSS-REFERENCE TO RELATED APPLICATIONS

This application claims the benefit of U.S. Provisional Patent Application No. 62/472,427, filed Mar. 16, 2017, which is incorporated by reference herein in its entirety.

STATEMENT REGARDING FEDERALLY SPONSORED RESEARCH OR DEVELOPMENT

None

BACKGROUND

Field of the Disclosure

The present disclosure generally relates to systems and methods for estimating the pose of an object from an input image. More specifically, the present disclosure relates to three-dimensional pose estimation of a symmetric or nearly-symmetric object.

Description of Related Art

Determining objects present in real images and attributes of those objects is useful for many applications. For instance, determining a pose of an object in an image can be used to facilitate effective operation of various systems. Examples of such applications include augmented reality ("AR"), robotics, automotive, aviation, and processes and operation of devices using machine vision, in addition to many other applications.

In AR environments, for example, a user may view an integration of artificial or virtual graphics with the user's natural surroundings. In one aspect, AR applications allow real images and/or video to be processed to add one or more virtual objects to a captured image and/or video and to align the virtual object(s) to the image and/or video in multiple dimensions to thereby allow the user to interact with the object in a "natural" manner in the AR environment. Thus, virtual objects that do not exist in reality or computer-generated copies of actual objects or structures of the user's natural surroundings can be added to the AR environment.

A challenge for current systems and methods involves determining the correct pose of a three-dimensional object that is symmetric (e.g., rotationally symmetric) since a symmetrical, or nearly-symmetrical (e.g., rotationally nearly-symmetric), object may have two of more orientations that appear to be very similar.

BRIEF SUMMARY

In one example, a method for estimating a three-dimensional ("3D") pose of an object having an angle of rotational symmetry includes: obtaining an image or a patch of an image which includes the object; determining, via a classifier, whether a rotation angle of the object in the image or the patch of the image is within a first predetermined range; and in response to a determination that the rotation angle is within the first predetermined range, determining a mirror image of the object, determining two-dimensional (2D) projections of a three-dimensional (3D) bounding box of the object by applying a trained regressor to the mirror image of the object in the image or a patch of an image, and estimating the 3D pose of the object based on the 2D projections.

In another aspect, an apparatus for estimating a three-dimensional ("3D") pose of an object having an angle of rotational symmetry includes a memory configured for storing an image or a patch of an image. A processor is configured to determine, via a classifier, whether a rotation angle of the object in the stored image or the patch of the image is within a first predetermined range. The processor is configured to, in response to a determination that the rotation angle is within the first predetermined range: determine a mirror image of the object; determine two-dimensional (2D) projections of a three-dimensional (3D) bounding box of the object by applying a trained regressor to the mirror image of the object in the image or the patch of the image; and estimate the 3D pose of the object based on the 2D projections.

In one example, an apparatus is provided for estimating a three-dimensional ("3D") pose of an object having an angle of rotational symmetry. The apparatus comprises: means for storing an image or a patch of an image; means for using a classifier to determine whether a rotation angle of the object in the image is within a first predetermined range; means, responsive to a determination that the rotation angle of the object in the image or the patch of the image is within the first predetermined range, for determining a mirror image of the object; and means, responsive to the determination that the rotation angle of the object in the image or the patch of the image is within the first predetermined range, means for using a regressor to determine two-dimensional (2D) projections of a three-dimensional (3D) bounding box of the object to the mirror image of the object in the image or the patch of the image; and means, responsive to the determination of 2D projections, for estimating the 3D pose of the object.

In another aspect, a non-transitory computer-readable storage medium has stored thereon or therein instructions that, when executed by a processor, perform a method for estimating a three-dimensional ("3D") pose of an object having an angle of rotational symmetry. The method comprises: obtaining an image or a patch of an image which includes the object; determining, via a classifier, whether a rotation angle of the object in the image or the patch of the image is within a first predetermined range; and in response to a determination that the rotation angle is within the first predetermined range: determining a mirror image of the object, and estimating two-dimensional (2D) projections of a three-dimensional (3D) bounding box of the object by applying a trained regressor to the mirror image of the object in the image or the patch of the image, and estimating the 3D pose of the object given the 2D projections.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim. The foregoing, together with other features and embodiments, will become more apparent upon referring to the following specification, claims, and accompanying drawings.

DETAILED DESCRIPTION

Figure 1:
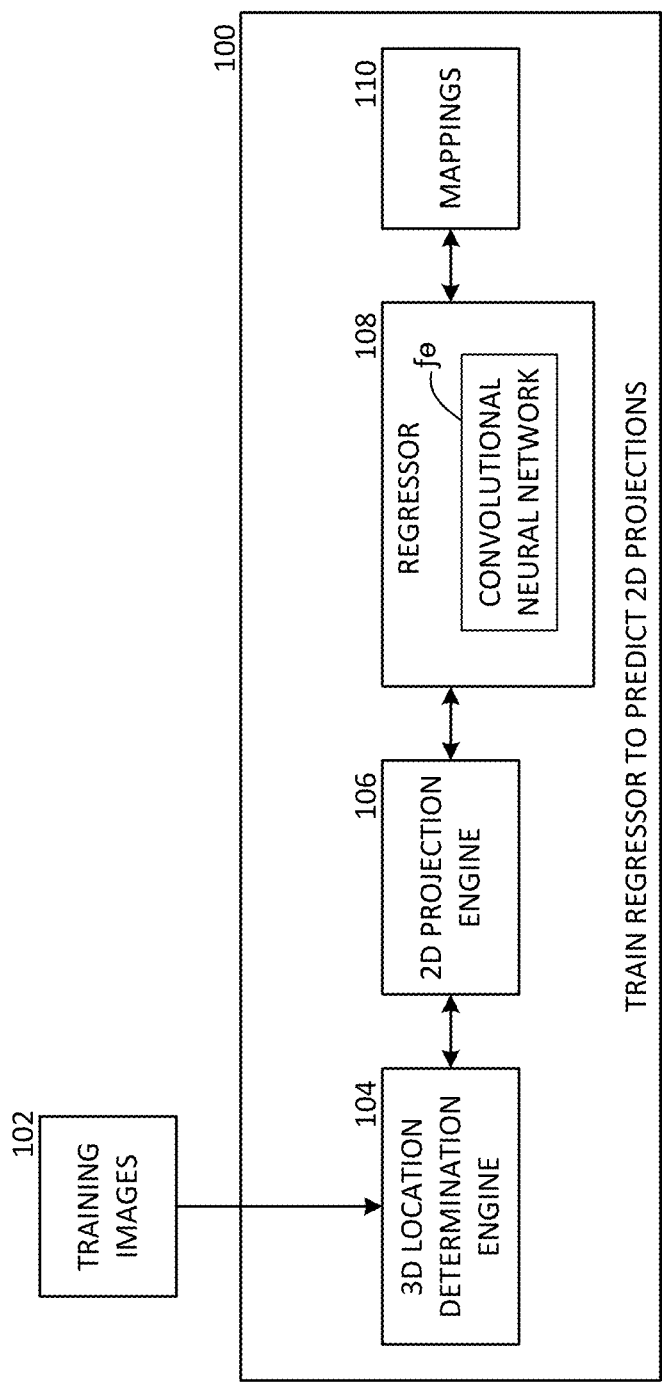
FIG. 1 is a block diagram for an exemplary regressor, according to an aspect of the present disclosure.

Certain aspects and embodiments of this disclosure are provided below. Some of these aspects and embodiments may be applied independently and some of them may be applied in combination as would be apparent to those of skill in the art. The figures and description are not intended to be restrictive.

This disclosure provides systems and methods that yield an improved three-dimensional pose estimate of a symmetrical, or nearly-symmetrical, object.

The system determines a three-dimensional ("3D") pose of an object from a two-dimensional ("2D") input image which contains the object. The system can reduce the processing time for determining a 3D pose of a symmetric (e.g., rotationally symmetric or having a plane of symmetry) or nearly-symmetric (e.g., rotationally nearly-symmetric) object The system uses a classifier (e.g., a neural network) to determine whether an image shows an object having a rotation angle within a first predetermined range (corresponding to objects on a first side of the plane of symmetry), or within a second predetermined range (corresponding to objects on a second side of the plane of symmetry, where the second side is opposite the first side). A regressor is trained to determine the poses of objects having a rotation angle within the second predetermined range (corresponding to objects on the second side of the plane of symmetry). In response to determining that the object has a rotational angle within the first predetermined range, the system determines a mirror image of the object about the plane of symmetry. The mirror image corresponds to an object in the second predetermined range. The trained regressor is applied to the mirror image, resulting in a 2D projection of a 3D bounding box of the object. A pose estimation engine determines the 3D pose based on the 2D projection.

In an aspect of the disclosure, a method of estimating a 3D pose of an object having an angle of rotational symmetry $\beta$ is provided. The method includes obtaining an image which includes the object, and determining a rotation angle $\alpha$ for the object in the obtained image, wherein $\alpha$ is determined with respect to a predetermined orientation for the object. The method also includes determining, for the condition where a is in a first predetermined range, a mirror image of the object in the obtained image, determining two-dimensional (2D) projections of a three-dimensional (3D) bounding box of the object by applying a trained regressor to the mirror image of the object in the image or patch, and estimating the 3D pose of the object given the 2D projections. In certain aspects, the first predetermined range for the rotation angle $\alpha$ is $\beta/2 < \alpha \le \beta$.

In a further aspect, the trained regressor is trained using a plurality of training images, wherein each of the training images is taken from a different point of view and includes the object with a respectively different pose from a plurality of poses, wherein each of the plurality of poses has a different pose rotation angle $\alpha_p$, wherein $\alpha_p$ is determined with respect to the predetermined orientation for the object, and wherein each $\alpha_p$ of the plurality of poses is in a second predetermined range. In certain aspects, the second predetermined range for the pose rotation angle $\alpha_p$ is $0° \le \alpha_p \le \beta/2$. In other aspects, each $\alpha_p$ of the plurality of training images has a respective pose in a third predetermined range, where the third predetermined range for the pose rotation angle $\alpha p$ is $0° - \delta \le \alpha_p \le (\beta/2) + \delta$, where $\delta$ is a predetermined angle which is less than $\beta$. In some embodiments, $\delta$ is a non-zero angle whose value is a real number less than $\beta$.

In a still further aspect, estimating the 3D pose of the object includes determining a first 3D bounding box of the mirror image of the object in the obtained image, determining a second 3D bounding box wherein the second 3D bounding box is a mirror image of the first 3D bounding box, determining a plurality of 2D projections of the second 3D bounding box, and estimating the 3D pose of the object using the plurality of 2D projections.

The method also includes, for the condition where a is in a second predetermined range, estimating the 3D pose of the object by applying the trained regressor to the image of the object in the obtained image.

In a still further aspect, the system determines a second 3D bounding box wherein the second 3D bounding box is a mirror image of the first 3D bounding box, determines a plurality of 2D projections of the second 3D bounding box, and estimates the 3D pose of the object using the plurality of 2D projections.

Some implementations of the methods, apparatuses, and non-transitory computer-readable mediums described above further comprise determining the plurality of 2D projections by applying a regressor to the mirror image of the object in the obtained image wherein the regressor is trained to predict 2D projections of the second 3D bounding box of the object in a plurality of poses wherein each of the plurality of poses has a pose rotation angle $\alpha_p$ where $0° \le \alpha_p \le \beta/2$. Other implementations include determining the plurality of 2D projections by applying a regressor to the mirror image of the object in the obtained image wherein the regressor is trained to predict 2D projections of the second 3D bounding box of the object in a plurality of poses wherein each of the plurality of poses has a pose rotation angle $\alpha_p$ where $0°-\delta \leq \alpha_p \leq (\beta/2)+\delta$, wherein $\delta$ is a predetermined angle. In certain examples, the ratio of $\delta$ to $\beta$ is approximately 0.03. In other examples, $\delta$ may be in the range of $0°<\delta \leq 10°$, $3° \leq \delta \leq 7°$, or $1° \leq \delta \leq 4°$. In other examples, where $\beta=180°$, $\delta=5°$. In still other examples, where $\beta=90°$, $\delta=2.5°$.

In some examples, the regressor is a convolutional neural network.

In some embodiments, the regressor performs supervised learning using labelled training images, wherein each of the training images is taken from a different point of view and includes the object with a different known pose from the plurality of poses. During training the system determines, for each of the plurality of training images, corresponding 3D locations of a training 3D bounding box for a corresponding pose of the object in each of the plurality of training images; determines, for each of the plurality of training images, corresponding training 2D projections of the training 3D bounding box of the object, the corresponding training 2D projections being determined by projecting the corresponding 3D locations of the training 3D bounding box onto an image plane of each of the plurality of training images; and determines mappings of each of the plurality of training images with the corresponding training 2D projections of the training 3D bounding box of the object. Following this training, the regressor can receive an image and determine a 2D projection of a 3D bounding box of an object in the image.

Further implementations of the methods, apparatuses, and non-transitory computer-readable mediums described above include estimating the 3D pose of the object by applying the plurality of 2D projections of the second 3D bounding box to the determined mappings.

In some implementations of the methods, apparatuses, and non-transitory computer-readable mediums described above, a classifier is used to determine if the rotation angle $\alpha$ for the object in the obtained image is in the range $\beta/2 < \alpha \leq \beta$.

In some examples, the classifier is a convolutional neural network.

Certain implementations of the methods, apparatuses, and non-transitory computer-readable mediums described above include determining the plurality of 2D projections by applying a regressor to a mirror image of the object in the obtained image wherein the regressor is trained to predict 2D projections of the second 3D bounding box in a plurality of poses wherein each of the plurality of poses has a pose rotation angle $\alpha_p$ where $0° \leq \alpha_p \leq \beta/2$, and the second 3D bounding box is a mirror image of the first 3D bounding box. (In other implementations, determining the plurality of 2D projections includes applying a regressor to the object in the obtained image wherein the regressor is trained to predict 2D projections of the second 3D bounding box in a plurality of poses wherein each of the plurality of poses has a pose rotation angle $\alpha_p$ where $0°-\delta \leq \alpha_p \leq (\beta/2)+\delta$, wherein $\delta$ is a predetermined angle. Still other implementations include estimating the 3D pose of the object includes applying the plurality of 2D projections of the second 3D bounding box to the determined mappings.

Three-dimensional ("3D") pose estimation is the process of determining the orientation (or rotation) and translation of an object in a two-dimensional ("2D") image which includes the 3D object. Pose estimation produces a 3D pose with six degrees of freedom, including three dimensions for orientation and three dimensions for translation. 3D pose estimation of object instances has become a popular problem, and has application in various fields. For example, 3D pose estimation can be used in robotics, virtual reality, augmented reality, as well as in many other fields.

Some approaches to 3D pose estimation rely on depth maps, in some cases in conjunction with more standard color images. The depth map information makes the 3D pose estimation problem easier to solve. However, in some cases, it may not be possible to use depth cameras. For example, a depth camera may fail in outdoor applications or on specular objects. Furthermore, depth cameras contain active sensors, and can drain the batteries of mobile devices.

It is desirable to be able to rely on monochrome (e.g., black and white) images, or color images, for 3D pose estimation. One possible approach using color images is to identify feature points lying on the object of interest. However, such feature point-based methods may be limited to very textured images. For example, keypoint-based methods may perform well, but only on very textured objects.

The availability of inexpensive 3D cameras favors the development of methods suitable for untextured objects. Some methods may rely on depth data only and may use votes from pairs of 3D points and their normals to detect 3D objects. (Voting algorithms provide an error masking capability in a variety of applications. Voting is an operation in a computation paradigm that arbitrates among the results of N redundant variants of a system or method. For example, an "inexact majority voter" refers to a system that produces a correct output if the majority of its inputs match each other or are within a predetermined interval of each other.) Other methods may use a decision tree applied to red-green-blue-depth ("RGB-D") images to simultaneously recognize the objects and predict their poses.

Template-based methods can also be used, which can consider low-textured objects. For example, other methods can consider a template-based representation computed from RGB-D, or RGB, data, which allows for large scale detection. After getting a match between the input image and a template, an Iterative Closest Point ("ICP") optimization can be performed between the 3D model of the detected object and the depth map. However, such template-based methods are sensitive to partial occlusions.

To consider low-textured objects while being robust to partial occlusions, the "object coordinates" of an object's pixels can be identified, which include the 3D coordinates of the pixels in a coordinate system related to the object. The object 3D pose can then be estimated using 2D-3D correspondences. Some methods can rely on local patches recognition performed with Random Forests. For example, 3D object coordinates can be considered by training a Random Forest to predict the 3D location in the object coordinate system of each image location. The prediction of this forest is integrated in an energy function together with a term that compares the depth map with a rendering of the object and a term that penalizes pixels that lie on the rendering of the object but predicted by the forest to not be an object point. A Random Sample Consensus ("RANSAC") optimization can be used to sort out the inlier object coordinates and to estimate the pose robustly. For example, the energy function can be optimized by a RANSAC procedure. Some methods replace this energy function by an energy computed from the output of a convolutional neural network ("CNN") trained to compare observed image features and features computed from a 3D rendering of the potentially detected object. This makes the approach robust to partial occlusions.

The above-described techniques, however, are designed for RGB-D data that includes depth information. Some methods extend these techniques to rely on RGB data only. For example, Auto-Context can be used to obtain better predictions from the random forests, estimate a distribution over the object coordinates to handle the prediction uncertainties better, and propose a more sophisticated RANSAC-like method that scales with the number of objects. This results in an efficient and accurate method, however robustness to partial occlusions is not demonstrated.

Part-pose based techniques demonstrate robustness to partial occlusions with RGB only images, however are based on part detection and therefore are used in the presence of distinctive parts on a target object. The part poses are predicted in the form of a set of 2D projections of virtual points.

Some methods rely on a CNN to directly predict a 3D pose, but in the form of a 3D vector and a quaternion. These methods are applied to camera relocalization rather than 3D object detection, and the full image can be used as input to the CNN. As described in more detail below, by predicting the 2D projections of the bounding box of an object (e.g., the corners of the bounding box, or other suitable points of the bounding box), the systems and methods described herein avoid the need for a scale factor to balance the position and orientation errors, and the pose is more accurate when predicted in this form.

Other methods also use a CNN to predict the 3D pose of generic objects, but from RGB-D data. For example, such methods may first segment the objects of interest to avoid the influence of clutter. However, segmenting the objects performs poorly on a LINEMOD dataset even with state-of-the-art segmentation methods, due to the objects being relatively small in the images and the resolution being relatively low. Segmentation is not needed in the systems and methods described herein, as a CNN trained with a cluttered background is able to predict a reliable 3D pose.

Efficient and accurate systems and methods for pose estimation of objects from images are described herein. For example, a 3D pose of an object from a color image (e.g., a red-green-blue (RGB) image, or other suitable color image) can be determined using the systems and methods described herein. The color image can be used as the sole input, without requiring depth information. For example, the systems and methods described herein can operate using RGB data without using depth, in which case an RGB-depth (RGB-D) image is not necessary.

The systems and methods can train a regressor to predict the 3D pose of an object given an entire input image or given a patch or window of the image centered on the object, even under cluttered background and partial occlusion. The regressor can be trained to predict the 3D pose of an object "holistically", directly from a color image of the image. The 3D pose of the object of interest can be predicted even when the image containing the object contains other objects in the background or objects partially occluding the object of interest, despite the difficulty of such a problem. This avoids the need for predicting the object coordinates and the RANSAC optimization as intermediate steps. As described herein, the regressor can include a convolutional neural network ("CNN") 1347, discussed in the description of FIG. 13. The regressor can then be applied to image locations determined by 2D location detection.

In some examples, the predicted 3D pose can be represented directly by a translation and a rotation (or orientation). In some examples, even better accuracy may be achieved in some instances by predicting 2D projections of a bounding box of the object (e.g., 2D projections of the corners of the bounding box), and then computing the 3D pose from these 2D-3D correspondences. For example, a correspondence of the 2D-3D correspondences can include a correspondence between the 3D location of a point of the bounding box (e.g., a 3D corner of the bounding box) and the 2D projection in the image of that point on the bounding box, as predicted by the regressor. These predictions can be outlier-free, and RANSAC is not needed. Moreover, using the 2D projections may also avoid the need for meta-parameters to balance the translation terms and the rotation terms.

In some examples, for improved accuracy, a network (e.g., a neural network) can be trained to update the 2D projections of the bounding box of an object, by comparing the input image and a rendering of the object for the initial pose estimate. For example, the network can be applied for a number of iterations—each iteration including a rendering of a respective pose near the initial estimated pose—and the pose that best matches the image selected to improve the pose accuracy. In one embodiment, the system generates a plurality of renderings (or masks) of the object for a plurality of poses around the estimated 3D pose of the object; and updating the 2D projections based on which pose of the plurality of poses corresponds to the rendering which matches the image.

Training the regressor to update the 2D projections can result in a simple, efficient, and accurate method.

FIG. 1 shows an example of a system 100 to train a regressor 108 to predict 2D projections from an image. The system 100 is configured to implement one or more aspects described herein. The system 100 trains the regressor 108 using training images 102. In some examples, the training images 102 can include entire images in which a target object of interest is located and undergoing one or more poses. In some examples, the training images 102 can include a training set made of image windows (denoted as W herein) containing the target object under one or more poses. Based on the training, the regressor 108 generates mappings 110 that can be stored and used for application to one or more input images to determine a 3D pose of one or more objects in the input images. The regressor 108 can include a convolutional neural network ("CNN") $f_\Theta$. As described in more detail below, the trained regressor 108 can be used to predict 2D projections of a bounding box of a target object in an image, which can then be used to compute the 3D pose of the object in the input image.

In some examples, for each of the training images 102, corresponding poses of a target object and 3D points of a bounding box of the object are known. For example, the 3D locations of the target object's bounding box points (e.g., corners of the bounding box) are already known during the training, as a 3D model of the object is known. The 3D points therefore do not need to be predicted during training. During the training phase, the 3D locations are used—they are projected to the image, using a ground truth pose, to get the 2D projections. ("Ground truth" refers to information provided by direct observation, i.e. empirical evidence. In this example, training is performed using a set of labeled data comprising images with respective known 2D projections of 3D bounding box corner locations, which are considered ground truth poses.) The 3D location determination engine 104 can determine the 3D locations of the points of the bounding box in each of the training images 102. Any 3D points on an object's bounding box can be determined by the 3D location determination engine 104. In some examples described herein, the 3D locations of the corners of an object's bounding box may be determined and used to train the regressor 108. However, one of ordinary skill will appreciate that any point along an object's bounding box can be used. In one illustrative example, for a first training image with a target object in a known pose, the 3D locations of the corners of the target object's bounding box in the pose are determined by the 3D location determination engine 104.

Figure 2:
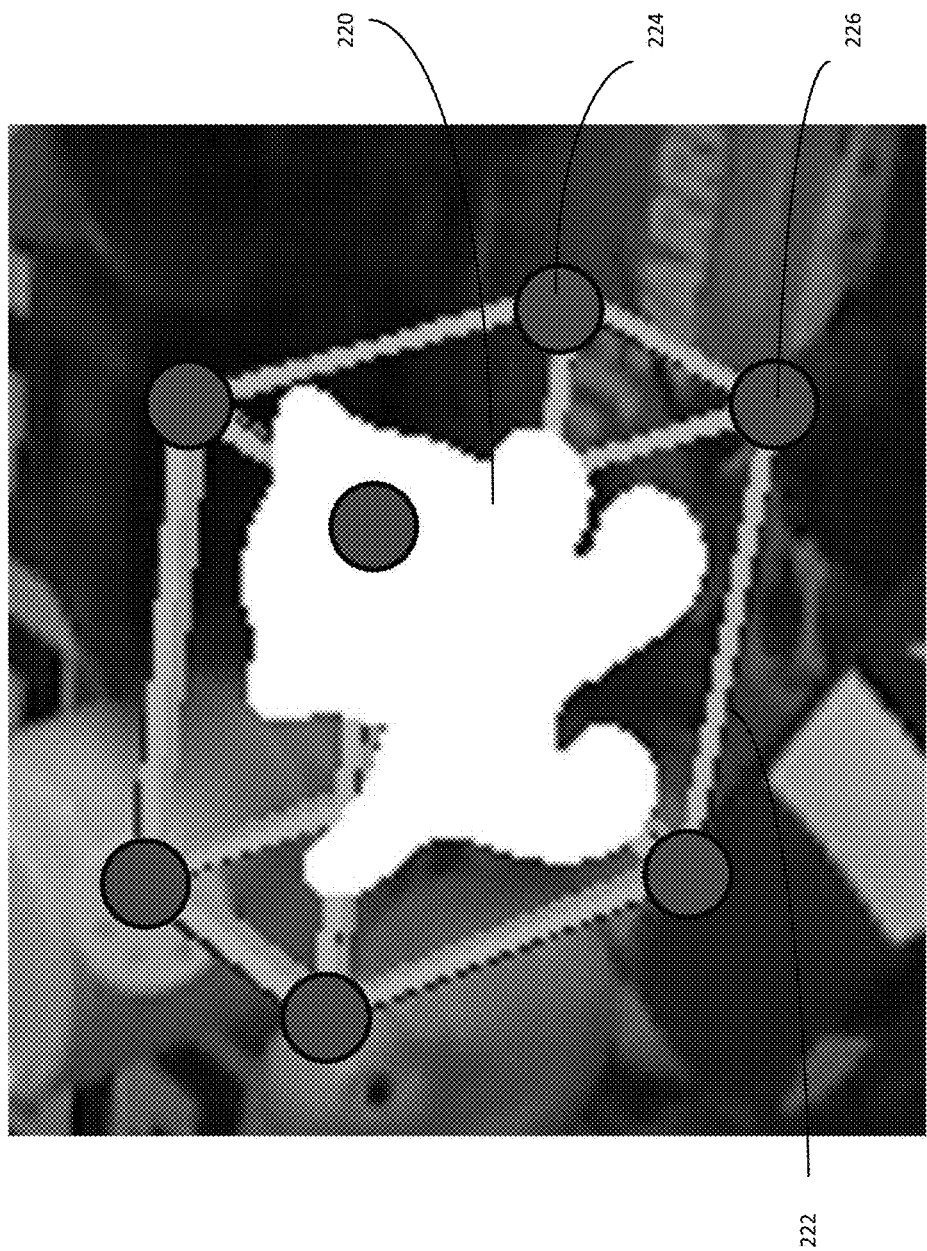
FIG. 2 is an illustration of an image in which a three-dimensional ("3D") bounding box is shown with two-dimensional ("2D") projections, according to an aspect of the present disclosure.

A 2D projection engine 106 can then determine 2D projections that correspond to the determined 3D locations of the points on the target object's bounding box. For example, the 2D projection engine 106 can determine the 2D projections by projecting the determined 3D locations of the corners of the bounding box onto an image plane of each training image (e.g., the eight corners of a bounding box surrounding a target object). Any suitable image projection technique for projecting 3D points of an object to an image plane may be used by the 2D projection engine 106. FIG. 2 shows an example of an image of a cat object 220 and a bounding box 222 of the cat object 220. The 2D projections of the eight corners of the bounding box are shown with dots on each corner, including 2D projection 224 and 2D projection 226.

The regressor 108 can generate mappings 110 based on the training. The mappings 110 can map an image with an object to the corresponding two-dimensional projections of the points on the bounding box of the object (e.g., the corners). During run-time when input images are processed for determining 3D poses of a target object in the images or patches, the 3D poses can be computed by mapping an input image with an object to the corresponding two-dimensional projections of the points on the bounding box. For example, by training the regressor 108 to predict 2D projections of a bounding box for a target object exhibiting different poses in the various training images, the pose engine 332 of FIG. 3 described below can use the trained regressor 108 to identify 2D projections of the target object's bounding box for an input image. The 2D projections can then be used to determine the 3D pose of the target object in the input image.

Figure 3:
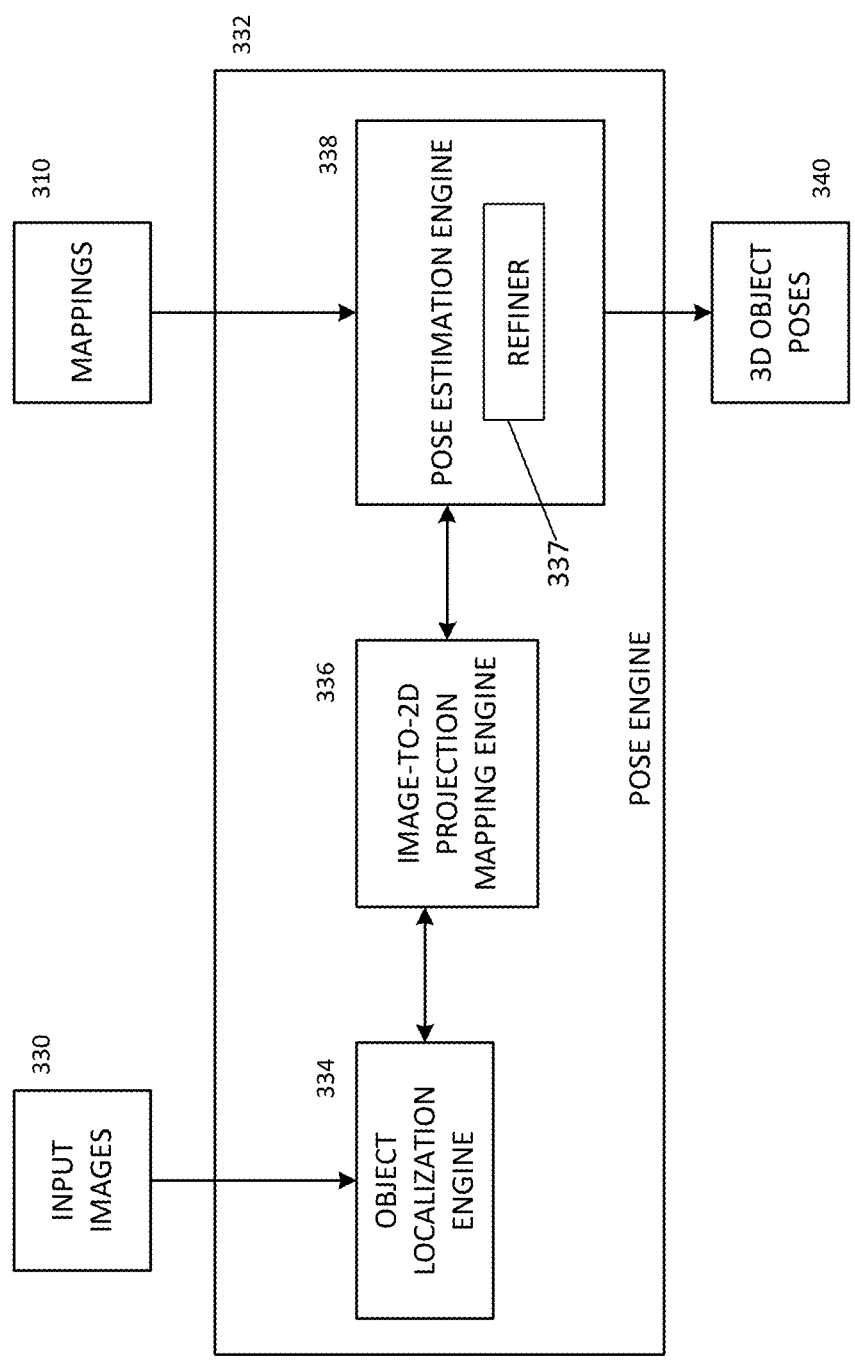
FIG. 3 is a block diagram for an exemplary system including a pose engine, according to an aspect of the present disclosure.

FIG. 3 shows an example of the pose engine 332, which is configured to implement one or more aspects of the disclosure described herein. The pose engine 332 can estimate 3D object poses 340 of a target object in input images 330 that are obtained by the pose engine 332. The input images 330 can include color images, such as red-green-blue ("RGB") images. For example, given a single color input image (e.g., an RGB image) including the target object, the pose engine 332 can estimate the 3D pose of the target object in the input image. The 3D pose can be estimated by the pose engine 332 based on the 2D projections of points on the object's 3D bounding box (e.g., the corners of the bounding box). It can be assumed that the 3D model of the target object is given.

Figure 4:
FIG. 4 is an illustration of an input image including an object, according to an aspect of the present disclosure.
Figure 5:
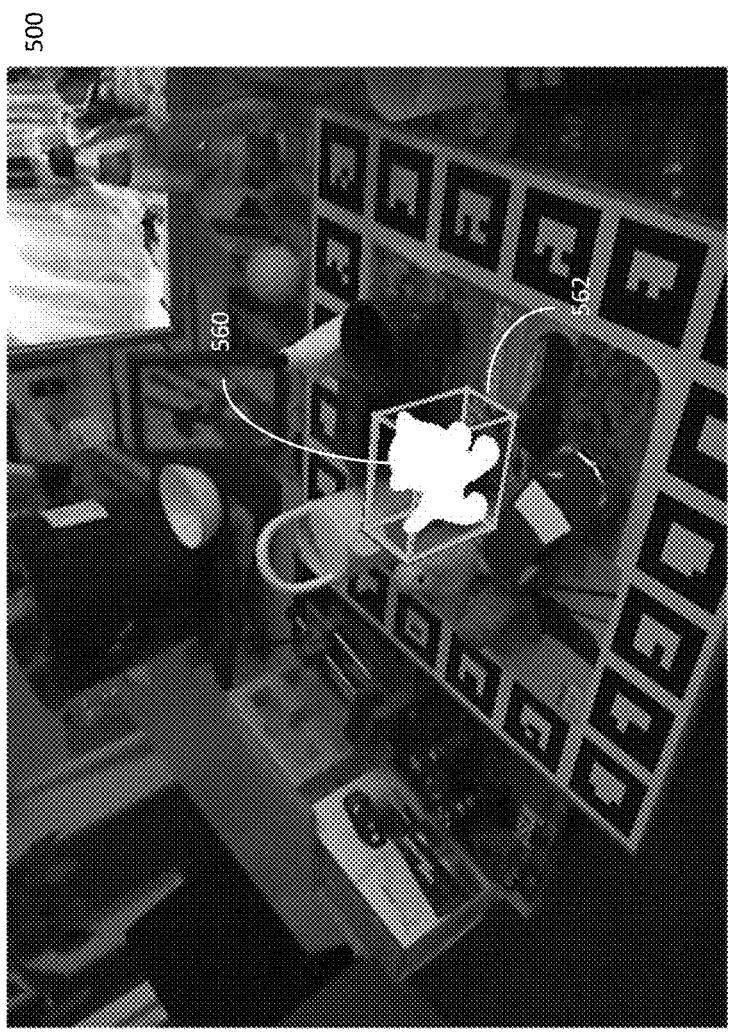
FIG. 5 is an illustration of an output image including a 3D bounding box, according to an aspect of the present disclosure.

The image-to-2D-projection mapping engine 336 can use the trained regressor 108 and the mappings 310 (which correspond to the mappings 110 described above with respect to FIG. 1) to identify the 2D projections of the points on the target object's bounding box for an obtained input image. FIG. 4 illustrates an example of an input image 400 with the cat object 220. As noted previously, the 2D projections of the points on the target object's bounding box can include the corners of the bounding box, such as the corners of the bounding box 222 of the cat object 220 shown in FIG. 2. As described in further detail below, the pose estimation engine 338 can then use the 2D projections to determine the 3D pose of the target object in the input image. In some embodiments, the pose estimation engine 338 has a refiner block 337 that receives an initial 3D pose estimate generated in the pose estimation engine 338 and generates an updated 3D pose. The pose estimation engine 338 can output the object poses 340 including the poses determined from the input images 330. FIG. 5 illustrates an example of an output image 500 with the object pose 560 of the cat object 220 and its bounding box 562.

Various implementations can be used to estimate the 2D projections of a target object's 3D bounding box given an image or an image window centered on the target object, and to estimate the object pose using the 2D projections. As described above, the regressor 108 can include a convolutional neural network ("CNN") $f_\Theta$, such as a deep neural network or other suitable CNN. In some examples, the CNN $f_\Theta$ of regressor 108 can be trained to predict the 3D pose of a target object given an image window W centered on the object. Details regarding determination of the image window W (also referred to herein as a patch) are described further below with respect to the object localization engine 334. In other examples, the entire image can be used instead of the image window W.

In some examples, the CNN $f_\Theta$ of regressor 108 can be trained by minimizing the following cost function over the parameters $\Theta$ of the CNN $f_\Theta$:

$$\sum_{(W,e,t)\in\mathcal{T}} \ell(W, e, t; \Theta), \quad (1)$$

where T is a training set made up of image windows W containing the object under a pose defined by an exponential map e and a 3D translation vector t. Each image window in the training set can have a different pose. The exponential map e is a way to parameterize a rotation, and is made of 3 values. At least two options can be used to predict or determine the 3D pose returned by the CNN $f_\Theta$, with one option including direct prediction of the pose and another option including predicting the pose through the 2D projections of the bounding box. The form of the loss function l in Equation (1) changes depending on which option is used.

When direct prediction of a pose of a target object is used, the l function can be expressed as the following in some examples:

$$\ell_d(W,e,t;\Theta) = \|R^\perp(e)R(e(f_\Theta(W))) - I\|_F^2 + \beta\|t - t(f_\Theta(W))\|^2. \quad (2)$$

The function e(.) returns the components of the output of the CNN $f_\Theta$ corresponding to the exponential map e. The function t(.) is similar to e(.), but returns the components of the output of the CNN $f_\Theta$ corresponding to the translation vector t. R(e) is the rotation matrix corresponding to the exponential map vector e. The form of the first term in Equation (2) allows the system to optimize over the rotation components without having to handle the fact that multiple representations correspond to the same rotation—this may be true for any rotation parameterization. At run-time (using a trained regressor), given an image window W centered on a target object of interest, the system can simply invoke the trained CNN $f_\Theta(.)$ to get an estimate of the pose (denoted as $(\hat{e},\hat{t}) = f_\Theta(W)$) of the target object in the given image window W.

When predicting the pose of a target object through the 2D projections of the object's bounding box, the l function can be expressed as the following in some examples:

$$\ell_r(W, e, t; \Theta) = \sum_i \|Proj_{e,t}(M_i) - m_i(f_\Theta(W))\|^2, \quad (3)$$

where the $M_i$ are the 3D coordinates of the corners of the bounding box (or other points of the bounding box in some examples) in the object coordinate system. The term $Proj_{e,t}(M)$ projects the point M on the image plane from the pose defined by e (rotation) and t (translation). The function $m_i(.)$ returns the components of the output of the CNN $f_\Theta$ corresponding to the predicted 2D projection coordinates of the i-th corner. At run-time (e.g., using the trained regressor 108 and the pose engine 332), given an image window W centered on a target object of interest, the 3D pose of the target object can then be estimated for the correspondences between the 3D points $M_i$ and the predicted $m_i(f_\Theta(W))$ using a pose estimation technique that estimates a pose given a set of 3D points in a world coordinate frame and their corresponding 2D points in the image. The 2D points in this example are the 2D projections estimated from an input image using the CNN $f_\Theta$ of regressor 108. In some examples, other 3D points could be used other than corners of the target object's bounding box. The corners of the bounding box are a natural choice as they encompass the object and are well spread in space.

One example of such a pose estimation technique that estimates a pose given a set of 3D points and their corresponding 2D points in the image includes perspective-n-point ("PnP") algorithm. The PnP algorithm estimates a pose of a calibrated camera (relative to a target object in a certain pose) using a given set of n 3D points of the object's bounding box in world coordinates and their corresponding 2D projections in the image. The calibrated intrinsic camera parameters can also be used. The camera pose includes six degrees-of-freedom, including the rotation (e.g., roll, pitch, and yaw) and the 3D translation of the camera with respect to the world. Any suitable PnP technique can be used, including P3P, efficient PnP ("EPnP"), or other suitable PnP technique. One example of an EPnP algorithm that can be used is described in Lepetit, V; Moreno-Noguer, M.; Fua, P. (2009). "*EPnP: An Accurate O(n) Solution to the PnP Problem*". *International Journal of Computer Vision*. 81 (2): 155-166, which is hereby incorporated by reference in its entirety and for all purposes.

In some examples, the refiner block 337 (FIG. 3) performs a refiner method to improve the accuracy of the pose estimates described above (using one or more of Equations 1-3). In some examples, the refiner method includes training a network (e.g., a neural network) to update the 2D projections of the bounding box of an object. The 2D projections can be updated by comparing an input image to a rendering of the object for an initial pose estimate. Another CNN (separate from the CNN $f_\Theta$ of regressor 108) can be trained that predicts an update to improve the pose. This CNN can be denoted as $g_\mu$. The input to $g_\mu$ is two-fold. The first input is the image window W (or patch). (The same image window W or patch that is used by the CNN $f_\Theta$ to determine the initial pose estimate). The second part of the input depends on the current estimate of the pose. For example, either a binary mask or a color rendering of the target object as seen from the current estimate can be used as the second input to $g_\mu$. The neural network $g_\mu$ determines the update to the 2D projections by generating a respective mask or rendering of the object for each respective one of a plurality of poses around and including the estimated 3D pose of the object, and updating the estimated 3D pose based on which pose of the plurality of poses corresponds to the rendering or mask among the plurality of renderings that correlates most with the image. In particular, the parameters $\mu$ of $g_\mu$ can be optimized by minimizing:

$$\sum_{(W,e,t)\in T}\sum_{(\hat{e},\hat{t})\in N(e,t)} \ell_{ref}(W, e, t, \hat{e}, \hat{t}, \mu), \quad (4)$$

where N(e,t) is a set of poses sampled around a particular pose (e,t). The loss function $l_{ref}(.)$ is defined as:

$$l_{ref}(W,e,t,\hat{e},\hat{t};\mu)=\Sigma_i \|Proj_{e,t}(M_i)-Proj_{\hat{e},\hat{t}}(M_i)-m_i g_\mu(W,\text{Render}(\hat{e},\hat{t}))\|^2, \quad (5)$$

where Render(e,t) is a function that returns a binary mask, or a color rendering, of the target object seen from the pose (e,t). At run-time, given a current estimate of the object pose (represented by the projections of the corners $\hat{v}=[\ldots \hat{m}_i^T \ldots]^T$) and the corresponding parameterization $(\hat{e}, \hat{t})$, this estimate can be updated by invoking $g_\mu$:

$$\hat{v} \leftarrow \hat{v} + g_\mu(W, \text{Render}(\hat{e},\hat{t})) \quad (6)$$

Figure 6:
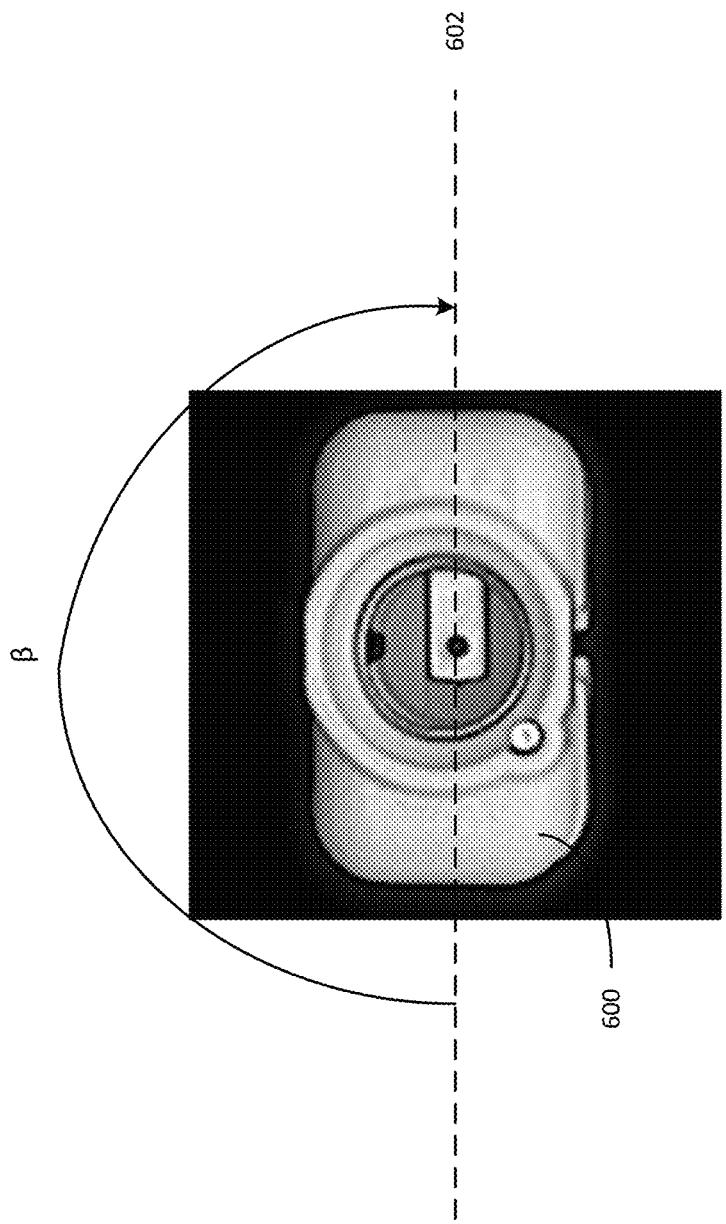
FIG. 6 is an illustration of a nearly-symmetrical object having an axis of symmetry, according to an aspect of the present disclosure.
Figure 7:
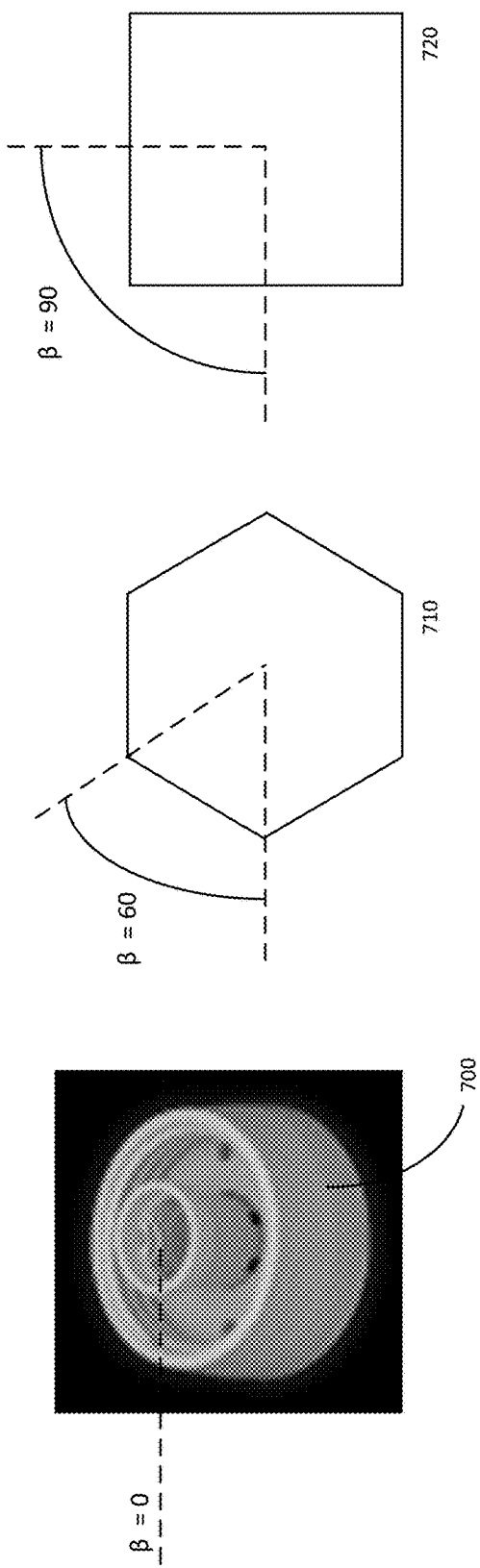
FIG. 7 includes illustrations of exemplary symmetrical objects showing angles of symmetry, according to an aspect of the present disclosure.

A challenge for current systems and methods involves determining the correct pose of a three-dimensional object that has an axis of rotational symmetry since a symmetrical (e.g., rotationally symmetrical), or nearly-symmetrical (e.g., rotationally nearly-symmetrical), object may have two of more orientations that appear to be very similar. Thus, predicting the correct pose for a symmetrical, or nearly-symmetrical, object involves additional processing compared to prediction for non-symmetrical (e.g., non-rotationally symmetric) objects since non-symmetrical objects may have unique poses. In an exemplary embodiment, FIG. 6 depicts a top view of a nearly-symmetrical object 600, which is generally a rectangular cuboid, showing one possible axis of rotational symmetry 602. In this particular embodiment, the angle of rotational symmetry, $\beta$, is 180° as shown, as measured along the axis of rotational symmetry 602. Other objects may have angles of rotational symmetry other than 180°. For example, as shown in FIG. 7 a generally cylindrical object 700 has an angle of rotational symmetry of $\beta=0°$ since there are an infinite number of axes of rotational symmetry through the circular cross-section. Objects such as object 710 which have a generally hexagonal cross-section have an angle of rotational symmetry of $\beta=60°$. Objects such as object 720 which have a generally square cross-section have an angle of rotational symmetry of $\beta=90°$. Those of skill in the art will appreciate that other objects with other angles of rotational symmetry are also contemplated herein and that the present disclosure is not limited to the simple examples discussed above.

Figure 8:
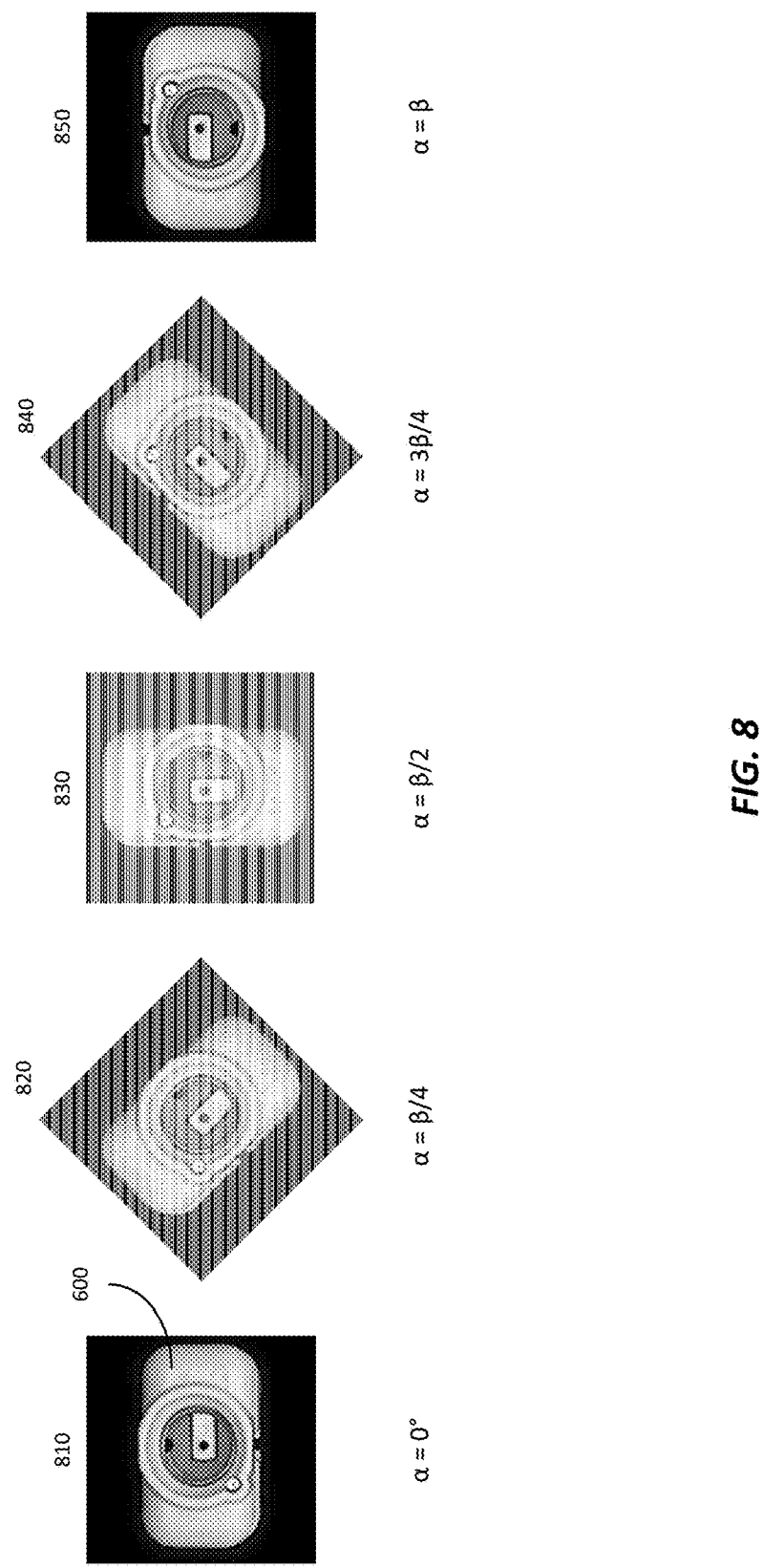
FIG. 8 depicts a nearly-symmetrical object with various rotation angles, according to an aspect of the present disclosure.

FIG. 8 illustrates the nearly-symmetrical object 600 (with $\beta=180°$) from FIG. 6 in five different orientations (poses): orientation 810 where the angle of rotation, $\alpha$, is $\alpha=0°$; orientation 820 where $\alpha=\beta/4$; orientation 830 where $\alpha=\beta/2$; orientation 840 where $\alpha=3\beta/4$; orientation 850 where $\alpha=\beta$. These orientations are exemplary only and are not intended to limit the disclosure in any manner. One of ordinary skill in the art will understand that a determined 3D bounding box (not shown) for the object, such as that shown in FIG. 2 and/or FIG. 5, will be oriented in a manner generally corresponding to the orientation of the object.

Note that orientation 840 is a mirror image of orientation 820 and that orientation 850 is a mirror image of orientation 810. Using this knowledge, for the five orientations shown only three orientations are unique: orientations 810, 820, and 830, since orientation 840 can be derived from orientation 820 by using a mirror image and orientation 850 can be derived from orientation 810, also by using a mirror image. Extending this relationship further, two regions, $r_1$ and $r_2$ can be defined, such that the first region $r_1$ has rotation angle $\alpha$ in the range $0°\leq\alpha\leq\beta/2$ and the second region $r_2$ has rotation angle $\alpha$ in the range $\beta/2<\alpha\leq\beta$. All orientations in the second region $r_2$ have a corresponding mirror image in the first region $r_1$. Therefore, a regressor (in an embodiment, a convolutional neural network), such as, but not limited to, the regressor discussed above, can be trained for orientations (poses) in the first region $r_1$ without training for poses in other regions. Doing so removes ambiguities by eliminating redundant orientations. For example, each pose (orientation) of the object in the training images for the regressor has a pose rotation angle $\alpha_p$ in the first region $r_i$. In an embodiment, the training images for the regressor have object pose rotation angles $\alpha_p$ only in the first region $r_i$.

In certain embodiments, the pose rotation angle $\alpha_p$ is within the range $0°-\delta \leq \alpha_p \leq (\beta/2)+\delta$, where $\delta$ is a predetermined angle. Allowing pose rotation angles of the training images for the regressor to include orientations on the fringes of the first region $r_i$ allows for improved performance for certain object shapes. In some embodiments, $\delta$ is much smaller than the angle of rotational symmetry $\delta$. In some embodiments, the ratio of $\delta$ to $\beta$ is approximately 0.03. In some embodiments, $\beta=180°$ and $\delta=5°$. In some embodiments, $\beta=90°$ and $\delta=2.5°$. In some embodiments, $0°<\delta \leq 10°$. In some embodiments, $3° \leq \delta \leq 7°$. In some embodiments, $1° \leq \delta \leq 4°$.

When estimating a 3D pose of an object, for example an object in an image, the object in the image or patch may have a rotation angle $\alpha$ that is outside of the first range $r_i$. Therefore, in order to estimate the 3D pose of the object a classifier is employed. In an embodiment, the classifier is a pattern recognition device. In another embodiment, the classifier is a convolutional neural network, described in the discussion of FIG. 13. As a non-limiting example for the nearly-symmetrical object 600 (with angle of rotational symmetry $\beta=180°$) shown in FIG. 8, the classifier distinguishes between the object 600 in orientation 820 (where $\alpha$ is in $r_i$) from the object 600 in orientation 840 (where $\alpha$ is in $r_2$).

For the condition where the rotation angle $\alpha$ of the object in the image or patch is in $r_2$, a mirror image of the object is determined prior to applying the regressor to the object. For the case where the object appears in the image or patch as a top view (for example, objects 710 and 720 in FIG. 7) or nearly a top view, instead of obtaining a mirror image of the object, the object may be rotated by an amount equal (or approximately equal) to the angle of rotational symmetry $\beta$ prior to applying the regressor to the image. For the condition where the rotation angle $\alpha$ is in $r_i$, the regressor can be applied to the object in the image directly, i.e., without having to determine a mirror image.

Figure 9:
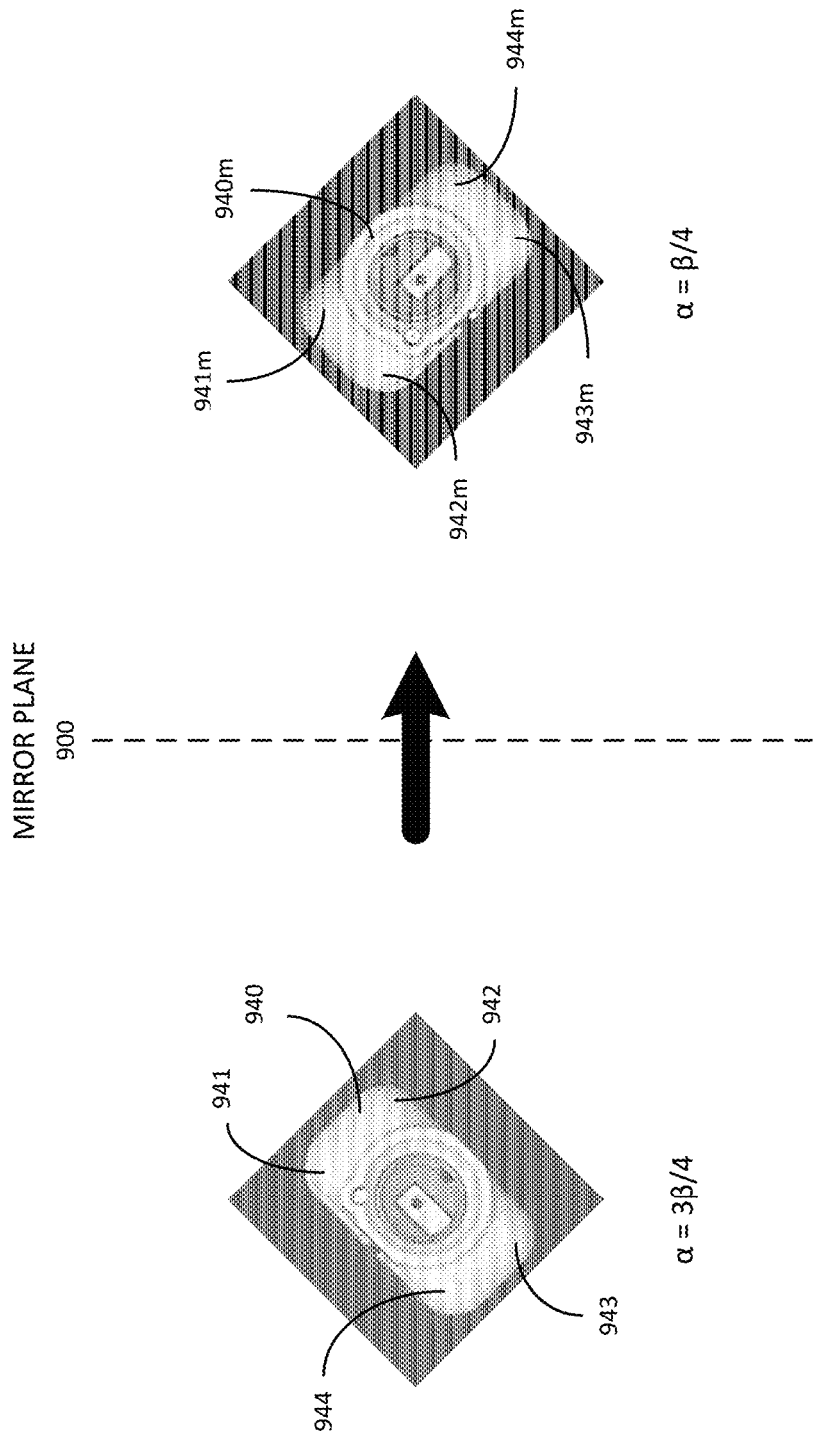
FIG. 9 is a depiction of obtaining a mirror image of a nearly-symmetrical object, according to an aspect of the present disclosure.

As a non-limiting example, FIG. 9 depicts the nearly-symmetrical object 940, taken from an obtained image, having an angle of rotational symmetry $\beta=180°$. The object 940 has a rotation angle $\alpha=3\beta/4$, which is outside of the first region $r_i$. Object 940 has four corners generally marked 941, 942, 943, and 944. Prior to applying the regressor to the object 940, a mirror image 940m is determined across mirror plane 900. For example, the coordinates of the object 940 can be transformed into a coordinate system having two orthogonal axes in the plane of symmetry, and a third orthogonal axis normal to the plane of symmetry. The coordinates of the mirror image can be determined by multiplying the coordinates along the third orthogonal axis by $-1$. Then the mirror image can be transformed back into the initial coordinate system. Mirror image 940m shows the effect on the corners of the object of making a mirror image. The corners of mirror image 940m, i.e., 941m, 942m, 943m, and 944m have changed their relative positions. This change can be compensated for upon determining the 3D bounding box of the mirror image 940m, as discussed below. Mirror image 940m has a rotation angle $\alpha$ of $\beta/4$. Thus, the regressor, which is trained for rotation angles $\alpha$ in $r_i$, can now be applied to the mirror image 940m.

The output of the regressor determines a 3D bounding box for the object or for the mirror image of the object. Where the regressor operated on the mirror image of the object, the determined 3D bounding box is manipulated to take into account the mirror imaging of the object. Therefore, the determined 3D bounding box is also mirror-imaged to thereby determine a revised 3D bounding box.

Figure 10:
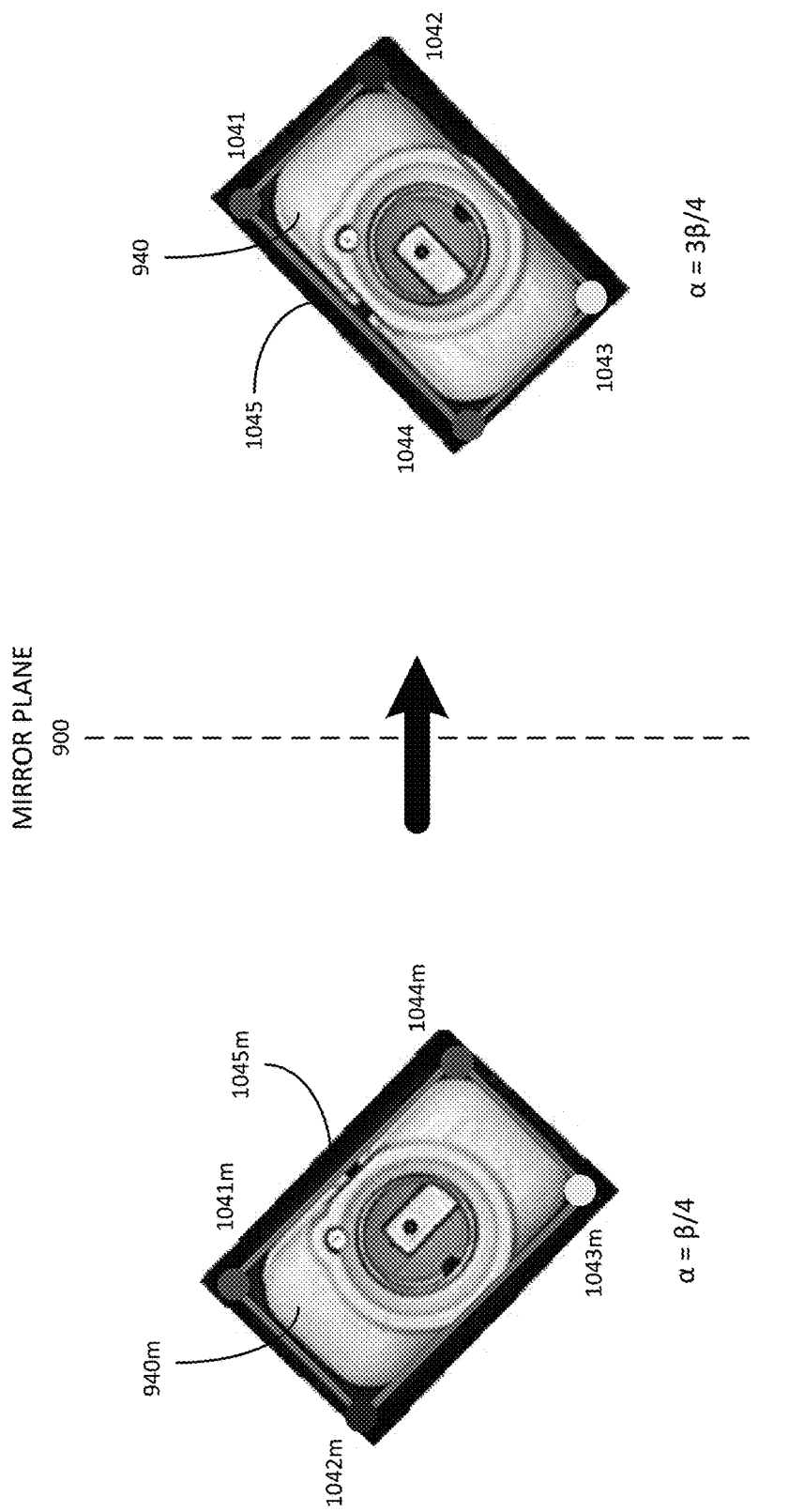
FIG. 10 is a depiction of obtaining a mirror image of a determined 3D bounding box, according to an aspect of the present disclosure.

As a non-limiting example, FIG. 10 depicts the nearly-symmetrical rectangular cuboid object of mirror image 940m from FIG. 9 and a 3D bounding box 1045m determined by the regressor. The 3D bounding box 1045m includes corners 1041m, 1042m, 1043m, and 1044m which correspond to the corners of the object 940, 941m, 942m, 943m, and 944m (corners not shown for clarity), respectively. In order to have the determined bounding box 1045m correspond to the correct orientation (or pose) of the object 940 in the obtained image, a mirror image of the bounding box 1045m is determined. The mirror image of the 3D bounding box 1045m is determined across mirror plane 900 and is shown as 3D bounding box 1045, including corners 1041, 1042, 1043, and 1044. As with the corners of the object 940 when it was mirrored, the corners of 3D bounding box 1045 have changed their relative positions with respect to the corners of the determined 3D bounding box 1045m. The 3D bounding box 1045 now corresponds to the orientation of the object 940 in the obtained image.

While the above description involves the use of a mirror plane oriented vertically in the drawings, those of skill in the art will understand that the teachings herein are not limited to that one orientation of the mirror plane.

Additionally, an orientation of the nearly-symmetrical object 600 having a rotation angle of $\alpha=5\beta/4$ is essentially indistinguishable from orientation 820 where $\alpha=\beta/4$, and likewise for other rotation angles greater than $\beta$. In certain embodiments, in order to distinguish, for example, an object having a rotation angle of $\alpha=5\beta/4$ from an object having a rotation angle of $\alpha=\beta/4$, another classifier (or the same classifier operating in a different mode) can be used to distinguish minor difference between the nearly-symmetrical object 600 in the $\alpha=5\beta/4$ orientation from the of $\alpha=\beta/4$ orientation to thereby obtain the correct orientation for the determined 3D bounding box.

Furthermore, those of skill in the art will readily understand that the systems and processes described herein can be implemented with more than two regions $r_i$ and $r_2$. For example, four regions may be used (e.g., $r_i$, $r_2$, $r_3$, and $r_4$), where orientations in $r_2$ are mirror images of orientations in $r_i$ and orientations in $r_4$ are mirror images of orientations in $r_3$, but then the regressor is trained for two regions, i.e., $r_i$ and $r_3$.

Figure 11:
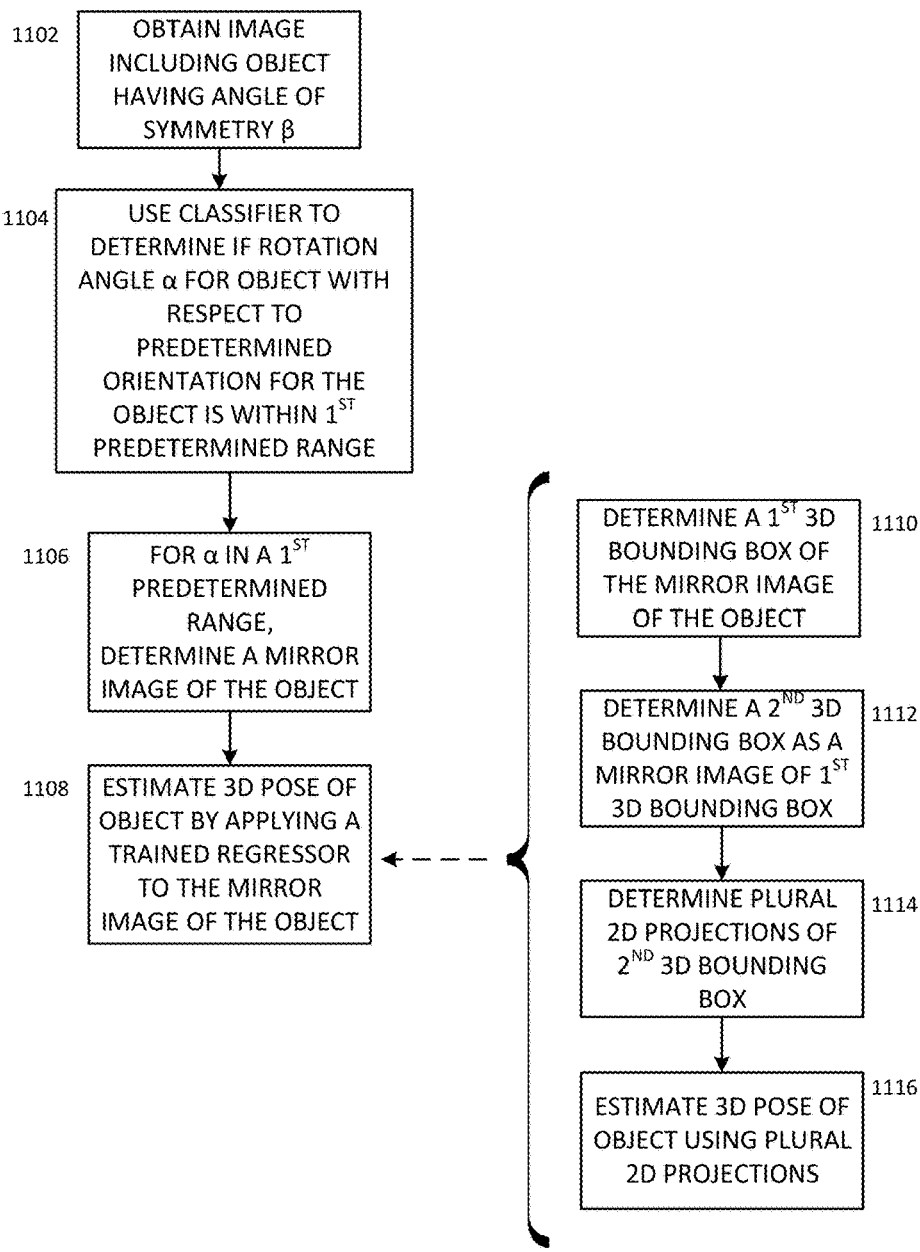
FIG. 11 is a flow chart for a process for estimating a 3D pose of an object, according to an aspect of the present disclosure.

FIG. 11 depicts an example of a process 1100. Process 1100 is a non-limiting example of estimating a pose (or orientation) of a 3D object having an angle of rotational symmetry $\beta$, using the techniques described herein. In some aspects, the process 1100 may be performed by a computing device or an apparatus, such as the regressor 108 shown in FIG. 1, the pose engine 332 shown in FIG. 3, or the computing device 1300 shown in FIG. 13, or any combination thereof. For example, the computing device or apparatus may include a mobile device, a personal computer (PC), or any other suitable device configured to carry out the steps of process 1100. In some examples, the computing device or apparatus may include a camera configured to capture images. In some examples, a camera or other capture device that captures image data is separate from the computing device, in which case the computing device receives the image data. The computing device may further include a network interface configured to communicate information to or from one or more other devices. The network interface may be configured to communicate Internet Protocol ("IP") based data or any other type of data.

Figure 12:
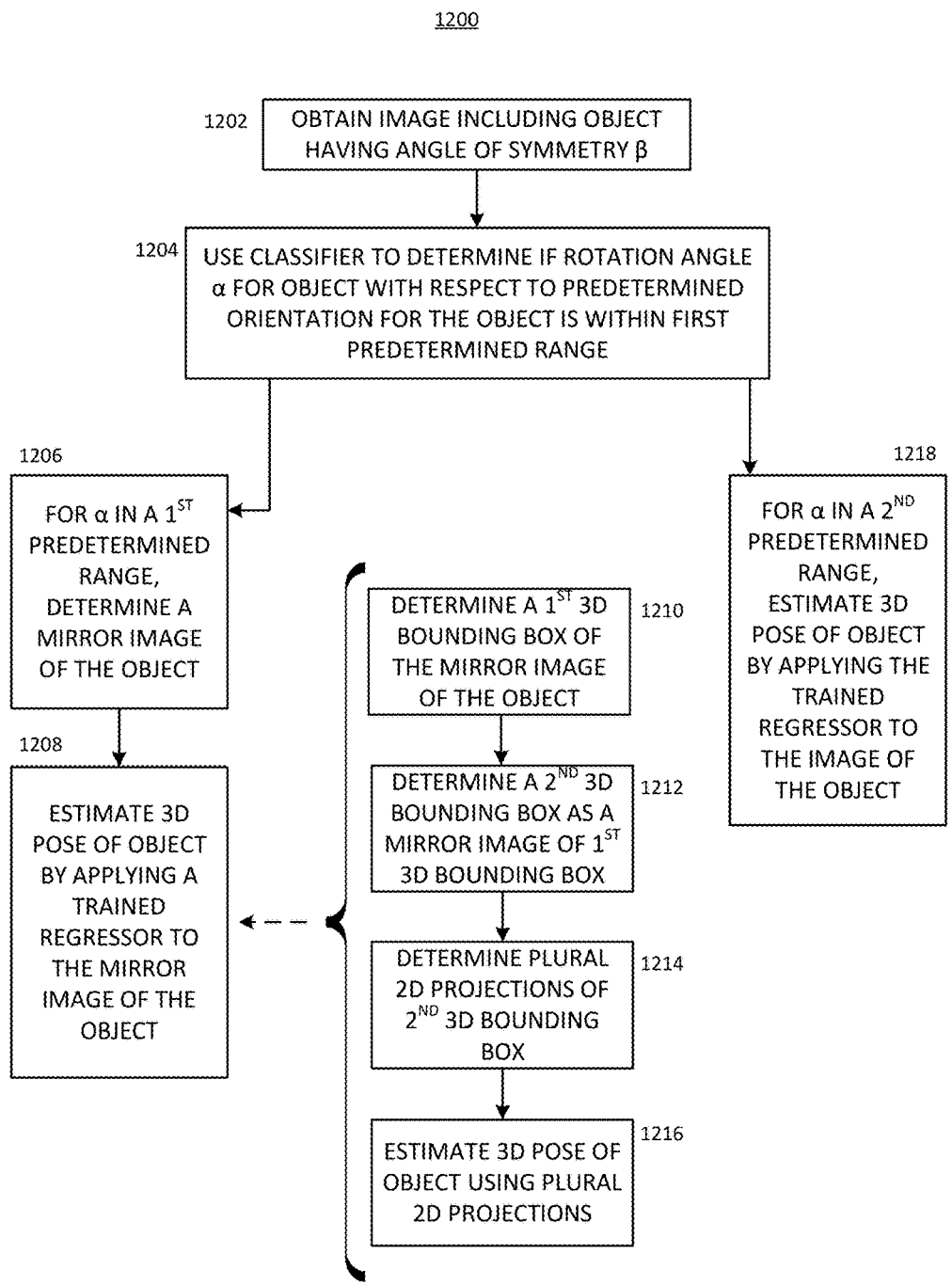
FIG. 12 is a flow chart for another process for estimating a 3D pose of an object, according to an aspect of the present disclosure.

FIG. 12 depicts an example of a process 1200. Process 1200 is a non-limiting example of estimating a pose (or orientation) of a 3D object having an angle of rotational symmetry β, using the techniques described herein. In some aspects, the process 1200 may be performed by a computing device or an apparatus, such as the regressor 108 shown in FIG. 1, the pose engine 332 shown in FIG. 3, or the computing device 1300 shown in FIG. 13, or any combination thereof. For example, the computing device or apparatus may include a mobile device, a personal computer (PC), or any other suitable device configured to carry out the steps of process 1200. In some examples, the computing device or apparatus may include a camera configured to capture images. In some examples, a camera or other capture device that captures image data is separate from the computing device, in which case the computing device can receive the image data. The computing device may further include a network interface configured to communicate information to or from one or more other devices. The network interface may be configured to communicate Internet Protocol ("IP") based data or any other type of data.

Processes 1100 and 1200 each are illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, each of the processes 1100 and/or 1200 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium is non-transitory.

With attention drawn to FIG. 11, at block 1102, the process 1100 includes obtaining an image which includes an object having an angle of rotational symmetry β. In some examples, the obtained image includes a red-green-blue ("RGB") image. In some implementations, the image does not include depth information. In one illustrative example, the input image can be obtained by the pose engine 332 of FIG. 3.

At block 1104, a rotation angle α is determined for the object in the obtained image, where a is determined with respect to a predetermined orientation for the object. Block 1104 uses a classifier to determine whether a is within a first predetermined range. At block 1106, where the rotation angle α is in a first predetermined range, a mirror image of the object in the obtained image is determined, as described above. In an embodiment, the first predetermined range is $β/2 < α ≤ β$. At block 1108, the 3D pose of the object is estimated by applying a trained regressor to the mirror image of the object in the obtained image.

In a particular embodiment, estimating the 3D pose of the object includes, at block 1110, determining a first 3D bounding box of the mirror image of the object in the obtained image, at block 1112, determining a second 3D bounding box where the second 3D bounding box is a mirror image of the first 3D bounding box, as described above, at block 1114, determining a plurality of 2D projections of the second 3D bounding box, and at block 1116, estimating the 3D pose (or orientation) of the object by using the plurality of 2D projections.

In blocks 1114 and 1116, the 2D projections are refined by inputting the image or the patch of the image, and the estimated 3D pose of the object to a neural network in the refiner block 337 (FIG. 3).

In block 1114, the refiner block 337 (FIG. 3) performs a refining operation, including generating a respective mask or rendering of the object for each respective one of a plurality of poses around and including the estimated 3D pose of the object.

In block 1116, the refiner block 337 (FIG. 3) determines an update to the 2D projections based on which of the renderings or masks correlates most with the image or the patch of the image.

In certain embodiments, the trained regressor is trained using a plurality of training images, where each of the training images is taken from a different point of view and includes the object with a different pose from a plurality of poses, where each of the plurality of poses has a different pose rotation angle $α_p$ where $α_p$ is determined with respect to the predetermined orientation for the object, and where each $α_p$ of the plurality of poses is in a second predetermined range. In an embodiment, the second predetermined range is $0° ≤ α_p ≤ β/2$. In another embodiment, the second predetermined range is $0° - δ ≤ α_p ≤ (β/2) - δ$, where δ is a predetermined angle that is less than β.

In an embodiment, the plurality of 2D projections is determined by applying a regressor to the mirror image of the object in the obtained image, where the regressor is trained to predict 2D projections of the second 3D bounding box in a plurality of poses where each of the plurality of poses has a pose rotation angle αp in the range $0° ≤ α_p ≤ β/2$. In another embodiment, the plurality of 2D projections is determined by applying a regressor to the mirror image of the object in the obtained image, where the regressor is trained to predict 2D projections of the second 3D bounding box in a plurality of poses where each of the plurality of poses has a pose rotation angle $α_p$ in the range $0° - δ ≤ α_p ≤ (β/2) - δ$, where δ is a predetermined angle.

In an embodiment, the ratio of δ to β is in a range from 0.01 to 0.05. In another embodiment, the ratio of δ to β is approximately 0.03. Other embodiments use different ratios of δ to β. In another embodiment, $β=180°$ and $δ=5°$. In another embodiment, $β=90°$ and $δ=2.5°$. In another embodiment, $0° < δ ≤ 10°$. In another embodiment, $3° ≤ δ ≤ 7°$. In another embodiment $1° ≤ δ ≤ 4°$. Other embodiments may use different values of δ.

In certain embodiments, the regressor is a convolutional neural network. In still other embodiments, the regressor is trained using a training method including inputting a plurality of training images into the regressor, wherein each of the training images is taken from a different point of view and includes the object with a different pose from the plurality of poses; determining, for each of the plurality of training images, corresponding 3D locations of a training 3D bounding box for a corresponding pose of the object in each of the plurality of training images; determining, for each of the plurality of training images, corresponding training 2D projections of the training 3D bounding box of the object, the corresponding training 2D projections being determined by projecting the corresponding 3D locations of the training 3D bounding box onto an image plane of each of the plurality of training images; and determining mappings of each of the plurality of training images with the corresponding training 2D projections of the training 3D bounding box of the object.

In still other embodiments, the 3D pose of the object is estimated by applying the plurality of 2D projections of the second 3D bounding box to the determined mappings. In yet other embodiments, a classifier is used to determine if a is $\beta/2 < \alpha \le \beta$, and in certain embodiments the classifier is a convolutional neural network.

Figure 11A:
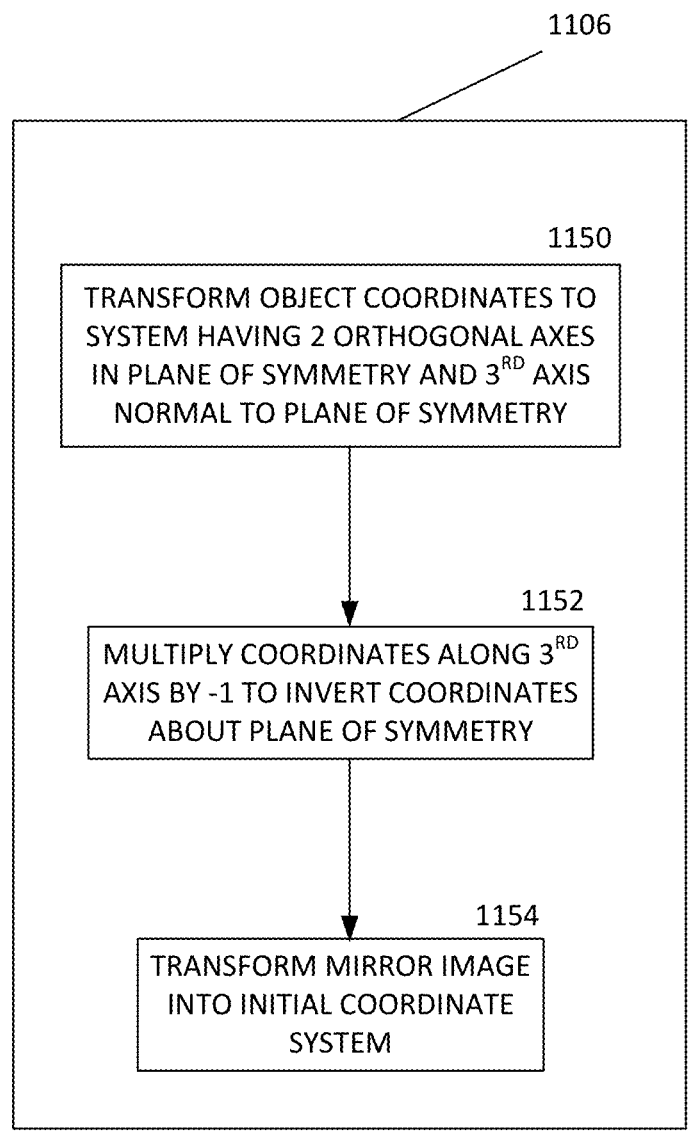
FIG. 11A is a flow chart showing details of determining a mirror image.

FIG. 11A is a flow chart showing details of an example of block 1106 for determining the mirror image of the object.

Block 1150 transforms a plurality of location coordinates of the object from an initial coordinate system into a second coordinate system having two orthogonal axes in a plane of symmetry of the object and a third orthogonal axis normal to the plane of symmetry.

Block 1152 inverts the coordinates about the plane of symmetry by multiplying the coordinates along the third orthogonal axis about the plane of symmetry.

Block 1154 transforms the mirror image into the initial coordinate system.

With attention drawn to FIG. 12, at block 1202, the process 1200 includes obtaining an image which includes an object having an angle of rotational symmetry $\beta$. In some examples, the obtained image includes a red-green-blue ("RGB") image. In some implementations, the image does not include depth information. In one illustrative example, the input image can be obtained by the pose engine 332 of FIG. 3.

At block 1204, a rotation angle $\alpha$ is determined for the object in the obtained image, where a is determined with respect to a predetermined orientation for the object. Block 1204 uses a classifier to determine whether a is within a first predetermined range. At block 1206, where the rotation angle $\alpha$ is in a first predetermined range, a mirror image of the object in the obtained image is determined, as described above. In an embodiment, the first predetermined range is $\beta/2 < \alpha \le \beta$. At block 1208, the 3D pose of the object is estimated by applying a trained regressor to the mirror image of the object in the obtained image. At block 1218, where the rotation angle $\alpha$ is in a second predetermined range, the 3D pose of the object is estimated by applying the trained regressor to the image of the object in the obtained image. In an embodiment, the second predetermined range is $0° \le \alpha \le \beta/2$.

In a particular embodiment, estimating the 3D pose of the object in block 1208 includes, at block 1210, determining a first 3D bounding box of the mirror image of the object in the obtained image, at block 1212, determining a second 3D bounding box where the second 3D bounding box is a mirror image of the first 3D bounding box, as described above, at block 1214, determining a plurality of 2D projections of the second 3D bounding box, and at block 1216, estimating the 3D pose (or orientation) of the object by using the plurality of 2D projections.

In certain embodiments, the trained regressor is trained using a plurality of training images, where each of the training images is taken from a different point of view and includes the object with a different pose from a plurality of poses, where each of the plurality of poses has a different pose rotation angle $\alpha_p$ where $\alpha_p$ is determined with respect to the predetermined orientation for the object, and where each $\alpha_p$ of the plurality of poses is in a third predetermined range. In an embodiment, the third predetermined range is $0° \le \alpha_p \le \beta/2$. In another embodiment, the third predetermined range is $0°-\delta \le \alpha_p \le (\beta/2)-\delta$, where $\delta$ is a predetermined angle that is less than $\beta$.

In an embodiment, the ratio of $\delta$ to $\beta$ is approximately 0.03. In another embodiment, $\beta=180°$ and $\delta=5°$. In another embodiment, $\beta=90°$ and $\delta=2.5°$. In another embodiment, $0°<\delta \le 10°$. In another embodiment, $3° \le \delta \le 7°$. In another embodiment $1° \le \delta \le 4°$.

Figure 13:
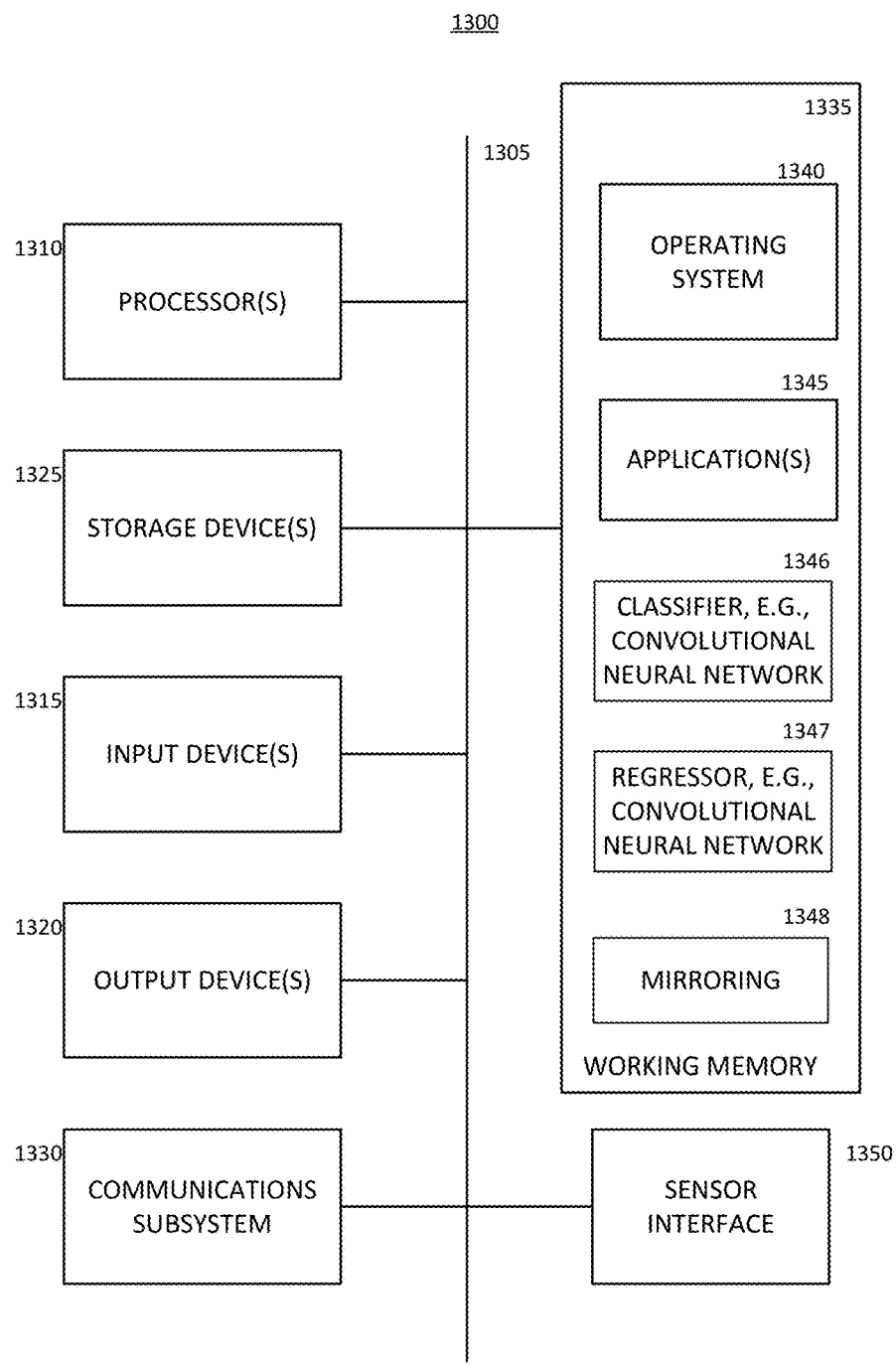
FIG. 13 is an example of a computing system, according to an aspect of the present disclosure.

FIG. 13 depicts an example computing device 1300 incorporating parts of a device that may be employed in practicing embodiments of the subject matter. A computing device as illustrated in FIG. 13 may be incorporated as part of any computerized system, herein. For example, computing device 1300 may represent some of the components of a mobile device, or a computing device executing a 3D editing tool. Examples of a computing device 1300 include, but are not limited to, desktops, workstations, personal computers, supercomputers, video game consoles, tablets, smart phones, laptops, netbooks, or other portable devices. FIG. 13 provides a schematic illustration of one embodiment of a computing device 1300 that may perform the methods provided by various other embodiments, as described herein, and/or may function as the host computing device, a remote kiosk/terminal, a point-of-sale device, a mobile multifunction device, a set-top box and/or a computing device. FIG. 13 is meant only to provide a generalized, non-limiting illustration of various components, any or all of which may be utilized as appropriate. FIG. 13, therefore, broadly illustrates how individual system elements may be implemented in a relatively separated or relatively more integrated manner.

The computing device 1300 is shown comprising hardware elements that may be electrically coupled via a bus 1305 (or may otherwise be in communication, as appropriate). The hardware elements may include one or more processors 1310, including without limitation one or more general-purpose processors and/or one or more special-purpose processors (such as digital signal processing chips, graphics acceleration processors, and/or the like); one or more input devices 1315, which may include without limitation a camera, sensors and/or sensor interface 1350, a mouse, a keyboard and/or the like; and one or more output devices 1320, which may include without limitation a display unit, a printer and/or the like.

The computing device 1300 may further include (and/or be in communication with) a means for storing, comprising one or more non-transitory machine-readable storage devices 1325, which may comprise, without limitation, local and/or network accessible storage, and/or may include, without limitation, a disk drive, a drive array, an optical storage device, a solid-form storage device such as a random access memory ("RAM") and/or a read-only memory ("ROM"), which may be programmable, flash-updateable and/or the like. Such storage devices may be configured to implement any appropriate data storage, including without limitation, various file systems, database structures, and/or the like.

The computing device 1300 might also include a communications subsystem 1330. The communications subsystem 1330 may include a transceiver for receiving and transmitting data or a wired and/or wireless medium. The communications subsystem 1330 may also include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 1330 may permit data to be exchanged with a network (such as the network described below, to name one example), other computing devices, and/or any other devices described herein. In many embodiments, the computing device 1300 will further comprise a non-transitory working memory 1335, which may include a RAM or ROM device, as described above. The working memory 1335 is configured for storing instructions, static data, and dynamic data, such as an image or a patch of an image that is processed.

The computing device 1300 may comprise software elements, shown as being currently located within the working memory 1335, including an operating system 1340, device drivers, executable libraries, and/or other code, such as one or more application programs 1345, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

The system can include one or more convolutional neural networks (CNN) 1346, 1347. The CNNs 1346, 1347 can be software implemented processes within working memory 1335, as shown in FIG. 13. In other configurations, the CNNs 1346, 1347 can be implemented in hardware (e.g., application-specific integrated circuits, ASIC) or in firmware. In some examples, the CNN 1346 provides a means for using a classifier to determine whether a rotation angle of the object in the image or patch is within a first predetermined range. In some examples, the CNN 1347 provides a means, responsive to a determination that the rotation angle of the object in the image or patch is within the first predetermined range, for estimating the 3D pose of the object by applying a trained regressor to the mirror image of the object in the image or patch.

The system can include a mirroring block 1348, which provides a means, responsive to a determination that the rotation angle of the object in the image or patch is within the first predetermined range, for determining a mirror image of the object. In one example, the mirroring block 1348 can transform the coordinates of the object 940 of FIG. 9 into a second coordinate system having two orthogonal axes in the plane of symmetry of the object, and a third orthogonal axis normal to the plane of symmetry. The mirroring block 1348 then determines coordinates of the mirror image by inverting the coordinates about the plane of symmetry (i.e., multiplying the coordinates along the third orthogonal axis by −1). Then the mirroring block 1348 can transform the mirror image back into the initial coordinate system. This is only an exemplary technique, and mirroring block 1348 can use other computations for determining a mirror image of the object.

A set of these instructions and/or code might be stored on a computer-readable storage medium, such as the storage device(s) 1325 described above. In some cases, the storage medium might be incorporated within a computing device, such as computing device 1300. In other embodiments, the storage medium might be separate from a computing device (e.g., a removable medium, such as a compact disc), and/or provided in an installation package, such that the storage medium may be used to program, configure and/or adapt a general purpose computer with the instructions/code stored thereon. These instructions might take the form of executable code, which is executable by the computing device 1300 and/or might take the form of source and/or installable code, which, upon compilation and/or installation on the computing device 1300 (e.g., using any of a variety of generally available compilers, installation programs, compression/decompression utilities, etc.) then takes the form of executable code.

Substantial variations may be made in accordance with specific implementations. For example, customized hardware can also be used, and/or particular elements might be implemented in hardware, software (including portable software, such as applets, etc.), or both. Further, connection to other computing devices 1300 such as network input/output devices may be employed.

Some embodiments may employ a computing device (such as the computing device 1300) to perform methods in accordance with the disclosure. For example, some or all of the procedures of the described methods may be performed by the computing device 1300 in response to processor 1310 executing one or more sequences of one or more instructions (which might be incorporated into the operating system 1340 and/or other code, such as an application program 1345 and/or CNN 1346) contained in the working memory 1335. Such instructions may be read into the working memory 1335 from another computer-readable medium, such as one or more of the storage device(s) 1325. Merely by way of example, execution of the sequences of instructions contained in the working memory 1335 might cause the processor(s) 1310 to perform one or more procedures of the methods described herein.

The terms "machine-readable medium" and "computer-readable medium," as used herein, refer to any non-transitory storage medium, portable or non-portable, that participates in storing and/or providing instructions and/or data that causes a machine to operate in a specific fashion. In an embodiment implemented using the computing device 1300, various computer-readable media might be involved in providing instructions/code to processor(s) 1310 for execution and/or might be used to store and/or carry such instructions/code (e.g., as signals). In many implementations, a computer-readable medium is a physical and/or tangible storage medium. Such a medium may take many forms, including, but not limited to, non-volatile media and volatile media. Non-volatile media include, for example, optical and/or magnetic disks, such as the storage device(s) 1325. Volatile media include, without limitation, dynamic memory, such as the working memory 1335. In an alternate embodiment, event-driven components and devices, such as cameras, may be used, where some of the processing may be performed in analog domain.

Common forms of physical and/or tangible computer-readable media include, for example, a floppy disk, a flexible disk, hard disk, magnetic tape, or any other magnetic medium, a compact disk ("CD"), Blue Ray disk (BD-ROM), digital versatile disk ("DVD"), or any other optical medium, punchcards, papertape, any other physical medium with patterns of holes, a dynamic or static random access memory (RAM), a programmable read-only memory (PROM), electrically erasable PROM (EEPROM), a FLASH-EEPROM, any other memory chip or cartridge, or any other medium from which a computer may read instructions and/or code.

A non-transitory computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents Various forms of computer-readable media may be involved in carrying one or more sequences of one or more instructions to the processor(s) 1310 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computing device 1300. These signals, which might be in the form of electromagnetic signals, acoustic signals, optical signals and/or the like, are all examples of carrier waves on which instructions may be encoded, in accordance with various embodiments.

The communications subsystem 1330 (and/or components thereof) generally will receive the signals, and the bus 1305 then might carry the signals (and/or the data, instructions, etc. carried by the signals) to the working memory 1335, from which the processor(s) 1310 retrieves and executes the instructions. The instructions received by the working memory 1335 may optionally be stored on a non-transitory storage device 1325 either before or after execution by the processor(s) 1310.

The exemplary embodiments described above may be implemented by hardware, software, firmware, middleware, microcode, hardware description languages, or any combination thereof. When implemented in software, firmware, middleware or microcode, the program code or code segments to perform the related tasks (e.g., a computer-program product) may be stored in a computer-readable or machine-readable medium. A processor(s) may perform the prescribed tasks.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The above description provides exemplary embodiments only, and is not intended to limit the scope, applicability, or configuration of the disclosure. Rather, the description of the exemplary embodiments provides those skilled in the art with an enabling description for implementing an exemplary embodiment. Various changes may be made in the function and arrangement of elements.

Specific details in the description above provide a thorough understanding of the embodiments. However, it will be understood by one of ordinary skill in the art that the embodiments may be practiced without these specific details. For example, circuits, systems, networks, processes, and other components have been shown as components in block diagram form in order not to obscure the embodiments in unnecessary detail. In other instances, well-known circuits, processes, algorithms, structures, and techniques have been shown without unnecessary detail in order to avoid obscuring the embodiments.

Specific details are given above to provide a thorough understanding of the examples. However, embodiments may be practiced without these specific details. For example, well-known circuits, processes, algorithms, structures, and techniques have been shown without unnecessary detail in order to avoid obscuring the embodiments. The description provides example embodiments only, and does not limit the scope, applicability, or configuration of the subject matter. Rather, the preceding description of the embodiments will provide those skilled in the art with an enabling description for implementing embodiments of the subject matter. Various changes may be made in the function and arrangement of elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of the techniques described above. Also, a number of blocks may be undertaken before, during, or after the above elements are considered. Accordingly, the above description does not limit the scope of the disclosure.

We claim:

1. A method for estimating a three-dimensional ("3D") pose of an object in an image having an angle of rotational symmetry, the method comprising:
   obtaining the image or a patch of the image which includes the object;
   determining, via a classifier, whether a rotation angle of the object in the image or the patch of the image is within a first predetermined range; and
   in response to a determination that the rotation angle is within the first predetermined range:
      determining a mirror image of the object;
      determining two-dimensional (2D) projections of a three-dimensional (3D) bounding box of the object by applying a trained regressor to the mirror image of the object in the image or the patch of the image; and estimating the 3D pose of the object based on the 2D projections.

2. The method of claim 1 wherein the trained regressor is trained using a plurality of training images, wherein each of the training images is taken from a different point of view and includes the object with a different pose from a plurality of poses, wherein each of the plurality of poses has a respectively different rotation angle, wherein each respective rotation angle is determined with respect to a predetermined orientation for the object, and wherein each respective rotation angle of the plurality of poses is in a second predetermined range.

3. The method of claim 2 wherein the first predetermined range is $\beta/2 < \alpha \le \beta$, where $\alpha$ is the rotation angle, and $\beta$ is the angle of rotational symmetry.

4. The method of claim 2 wherein a second predetermined range is $0° \le \alpha_p \le \beta/2$, where $\alpha_p$ is the rotation angle, and $\beta$ is the angle of rotational symmetry.

5. The method of claim 2 wherein a second predetermined range is $0° - \delta \le \alpha_p \le (\beta/2) + \delta$, wherein $\alpha_p$ is the rotation angle, $\beta$ is the angle of rotational symmetry, and $\delta$ is a non-zero angle.

6. The method of claim 5 wherein $\delta$ is smaller than $\beta$.

7. The method of claim 1, further comprising refining the 2D projections by inputting the image or the patch of the image, and the estimated 3D pose of the object to a neural network.

8. The method of claim 7, wherein the refining comprises:

generating a respective mask or rendering of the object for each respective one of a plurality of poses around and including the estimated 3D pose of the object; and determining an update to the 2D projections based on which of the renderings or masks correlates most with the image or the patch of the image.

9. The method of claim 1, wherein determining 2D projections of a 3D bounding box of the object includes determining 2D projections of a plurality of corners of the 3D bounding box.

10. The method of claim 1, wherein determining the mirror image of the object includes:

transforming a plurality of location coordinates of the object from an initial coordinate system into a second coordinate system having two orthogonal axes in a plane of symmetry of the object and a third orthogonal axis normal to the plane of symmetry;

inverting the coordinates about the plane of symmetry; and transforming the mirror image into the initial coordinate system.

11. The method of claim 1 wherein estimating the 3D pose of the object includes:

determining a first 3D bounding box of the mirror image of the object in the image or the patch of the image;

determining a second 3D bounding box wherein the second 3D bounding box is a mirror image of the first 3D bounding box;

determining a plurality of 2D projections of the second 3D bounding box; and estimating the 3D pose of the object using the plurality of 2D projections.

12. The method of claim 1 wherein the regressor includes a convolutional neural network.

13. The method of claim 1 wherein the regressor includes a deep neural network.

14. The method of claim 1 wherein the classifier includes a convolutional neural network.

15. The method of claim 1, further comprising, in response to a determination that the rotation angle is in a second predetermined range, estimating the 3D pose of the object by applying the trained regressor to the image or the patch of the image.

16. The method of claim 15 wherein each of a plurality of poses has a respective rotation angle, each respective rotation angle is determined with respect to a predetermined orientation for the object, each respective rotation angle of the plurality of poses is in a third predetermined range, and the third predetermined range from $0°$ to $\beta/2$, where $\beta$ is the angle of rotational symmetry.

17. The method of claim 15 wherein the classifier is used to determine if $\alpha$ is in the second predetermined range.

18. An apparatus for estimating a three-dimensional ("3D") pose of an object in an image having an angle of rotational symmetry, comprising:

a memory configured for storing the image or a patch of the image; and a processor configured to:

determine, via a classifier, whether a rotation angle of the object in the image or the patch of the image is within a first predetermined range; and in response to a determination that the rotation angle is within the first predetermined range:

determine a mirror image of the object;

determine two-dimensional (2D) projections of a three-dimensional (3D) bounding box of the object by applying a trained regressor to the mirror image of the object in the image or the patch of the image; and estimate the 3D pose of the object based on the 2D projections.

19. The apparatus of claim 18 wherein the 3D pose of the object is estimated by:

determining a first 3D bounding box of the mirror image of the object in the stored image or patch of the image;

determining a second 3D bounding box wherein the second 3D bounding box is a mirror image of the first 3D bounding box;

determining a plurality of 2D projections of the second 3D bounding box; and estimating the 3D pose of the object using the plurality of 2D projections.

20. The apparatus of claim 18 wherein the regressor is a convolutional neural network.

21. The apparatus of claim 18 wherein the classifier is a convolutional neural network.

22. The apparatus of claim 18, wherein the processor is configured to, estimate the 3D pose of the object by applying the trained regressor to the image or the patch of the image of the object, in response to a determination that a is in a second predetermined range.

23. The apparatus of claim 18, wherein the processor is further configured to refine the 2D projections by inputting the image or the patch of the image and the estimated 3D pose of the object to a neural network.

24. The apparatus of claim 23, wherein the neural network is configured to:

generate a respective mask or rendering of the object for each respective one of a plurality of poses around and including the estimated 3D pose of the object; and determine an update to the 2D projections based on which of the renderings or masks correlates most with the image or the patch of the image.

25. An apparatus for estimating a three-dimensional ("3D") pose of an object in an image having an angle of rotational symmetry, comprising:
- means for storing the image or a patch of the image;
- means for using a classifier to determine whether a rotation angle of the object in the image or the patch of the image is within a first predetermined range;
- means for determining a mirror image of the object in response to a determination that the rotation angle of the object in the image or the patch of the image is within the first predetermined range;
- means for using a regressor to determine two-dimensional (2D) projections of a three-dimensional (3D) bounding box of the object to the mirror image of the object in the image or the patch of the image; and
- means for estimating the 3D pose of the object in response to the determination of 2D projections.

26. A non-transitory computer-readable storage medium having stored thereon or therein instructions that, when executed by a processor, perform a method for estimating a three-dimensional ("3D") pose of an object in an image having an angle of rotational symmetry, the method comprising:
- obtaining the image or a patch of the image which includes the object;
- determining, via a classifier, whether a rotation angle of the object in the image or the patch of the image is within a first predetermined range; and
- in response to a determination that the rotation angle is within the first predetermined range:
  - determining a mirror image of the object,
  - estimating two-dimensional (2D) projections of a three-dimensional (3D) bounding box of the object by applying a trained regressor to the mirror image of the object in the image or the patch of the image, and
  - estimating the 3D pose of the object given the 2D projections.

27. The non-transitory computer-readable medium of claim 26, wherein $\alpha$ is in a second predetermined range, estimating the 3D pose of the object by applying the trained regressor to the image or the patch of the image of the object.

* * * * *